(12) United States Patent
Oka et al.

(10) Patent No.: US 6,564,553 B2
(45) Date of Patent: May 20, 2003

(54) BRAKING PRESSURE INTENSIFYING MASTER CYLINDER

(75) Inventors: Hiroyuki Oka, Higashimatsuyama (JP); Michio Kobayashi, Higashimatsuyama (JP); Masahiro Shimada, Higashimatsuyama (JP); Mamoru Sawada, Kariya (JP); Kazuya Maki, Kariya (JP); Hiroaki Niino, Kariya (JP)

(73) Assignees: Bosch Braking Systems Co., Ltd., Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 09/842,109

(22) Filed: Apr. 26, 2001

(65) Prior Publication Data

US 2002/0053206 A1 May 9, 2002

(30) Foreign Application Priority Data

Nov. 9, 2000 (JP) ........................................ 2000-341592

(51) Int. Cl.[7] ............................................. B60T 13/12
(52) U.S. Cl. .............................. 60/550; 60/552; 60/413
(58) Field of Search ........................... 60/552, 553, 550, 60/582, 413, 417

(56) References Cited

U.S. PATENT DOCUMENTS

| 3,675,422 A | * | 7/1972 | Drutchas et al. ............ 180/271 |
| 4,087,972 A | * | 5/1978 | Scheffel ..................... 60/547.3 |
| 4,359,869 A | * | 11/1982 | Ideta ......................... 60/547.3 |
| 4,441,319 A | * | 4/1984 | Brown ........................ 60/548 |
| 5,291,675 A | * | 3/1994 | Matsuda et al. .............. 303/10 |
| 5,526,731 A | * | 6/1996 | Hashida ...................... 60/552 |
| 5,715,680 A | * | 2/1998 | Kruckemeyer et al. ....... 60/552 |
| 6,142,584 A | * | 11/2000 | Towers et al. .......... 303/114.1 |

* cited by examiner

Primary Examiner—Edward K. Look
Assistant Examiner—Igor Kershteyn
(74) Attorney, Agent, or Firm—Kanesaka & Takeuchi

(57) ABSTRACT

In a braking pressure intensifying master cylinder, as an input shaft (53) travels forwards in a braking maneuver, a control valve (54) is actuated to develop fluid pressure according to the input in a reaction chamber (38) and a pressurized chamber (35). A stepped spool (45) as a part of the control valve 54 travels such that force produced by the fluid pressure and spring force of a spring (51) are balanced, whereby the stepped spool (45) can function as a travel simulator. By changing the pressure receiving areas of the stepped spool and/or changing the spring force of the spring (51), the travel characteristic of the input shaft (53) as the input side can be freely changed independently from the output side, without influence on a master cylinder pressure as the output side of the braking pressure intensifying a master cylinder (1). In addition, the master cylinder pressure can be intensified when necessary with a simple structure.

17 Claims, 10 Drawing Sheets

BRAKING PRESSURE INTENSIFYING MASTER CYLINDER

BACKGROUND OF THE INVENTION

The present invention relates to a technical field of a pressure intensifying master cylinder in which master cylinder pressure is intensified with fluid pressure regulated according to the input force applied through an operating means and, more particularly, to a technical field of a pressure intensifying master cylinder in which the input side and the output side are separately operated so that the input travel can be set freely without the influence of operation of the output side. In the following description, the term "master cylinder" will be sometimes referred to as "MCY".

For example, in a conventional brake system of an automobile, a braking pressure intensifying device has been employed which hydraulically intensifies the pedal force on a brake pedal into predetermined magnitude to develop large braking pressure. The braking pressure intensifying device functions to provide large braking force from small pedal force on the brake pedal, thereby securing the braking performance and reducing the fatigue of a driver.

In the conventional braking pressure intensifying devices, a control valve is actuated by an input based on the pedal force applied to the brake pedal to develop hydraulic fluid pressure according to the input and the developed hydraulic fluid pressure is introduced into a power chamber, thereby intensifying the input at a predetermined ratio to output intensified pressure. A piston of a master cylinder is moved by the output of the braking pressure intensifying device so that the master cylinder outputs master cylinder pressure. The master cylinder pressure is introduced as braking pressure into wheel cylinders, thereby actuating the wheel brakes.

By the way, conventional brake systems employ various brake controls such as for controlling the braking force in a brake maneuver, for example, Anti-Lock Control (ABS), Brake Assist Control for assisting pedal force in the event of emergency braking, and Regenerative Brake Coordination Control for controlling the braking pressure produced by a service brake system when a regenerative brake system is used to develop braking pressure during the braking by the service brake system, and automatic brake controls, for example, a brake control for controlling the distance from another vehicle, a brake control for avoiding a collision with an obstacle object, and Traction Control (TRC).

Most of such brake controls are normally conducted in a brake circuit between the master cylinder and the wheel cylinders. However, when the brake control is conducted in the brake circuit after the master cylinder, it is required to prevent the input travel of the braking pressure intensifying device from being influenced by such brake controls, for instance, for obtaining better operational feel.

However, in a brake system in which a conventional braking pressure intensifying device and a brake master cylinder are combined, the travel of a piston of the master cylinder is fixed by the relation between the master cylinder and wheel cylinders. The travel of an input shaft of the braking pressure intensifying device i.e. the pedal travel of a brake pedal, depends on the travel of the piston of the master cylinder. Consequently, the travel of input side is influenced by the brake controls conducted in the brake circuit after the master cylinder. In the combination between the conventional braking pressure intensifying device and the brake master cylinder, it is difficult to securely and sufficiently satisfy the aforementioned requirement.

For changing the travel characteristic of the brake pedal as the input side to obtain better operational feel, the brake master cylinder and the brake circuit after the brake master cylinder are also influenced so that some change on the output side, for instance a size change on the master cylinder, should be required. By the change on the output side, the output characteristic of the brake system is influenced. This means that the overall change on the brake system is required, i.e. large-scale change is required.

It is further desired that the input side is influenced as little as possible by brake circuit which may differ according to the type or size of vehicle.

If the input side and the output side are just separated from each other to produce outputs regardless of the travel of the input side, the input side does not travel so that the travel of the input side can not be ensured.

For this, it has been conventionally proposed that a travel simulator is provided on the brake circuit after the master cylinder to prevent the travel of the input side from being influenced by the brake control after the master cylinder and to ensure the travel of the input side.

However, to add specially the travel simulator, many parts such as a travel cylinder and an electromagnetic shut-off valve used for the travel simulator are required, making the structure complex and increasing the cost.

There is still a problem that brakes must be securely operated in case of a fluid pressure source failure even with a travel simulator.

In an anti-lock control system, it is desired that when one or more braked wheels are in locking tendency, the braking force is controlled to cancel the locking tendency of the wheels. Further, in a regenerative coordination brake system, when the regenerative brake system is operated during the operation of the braking pressure intensifying device, the braking force produced by the braking pressure intensifying device should be reduced by an amount corresponding to the braking force produced by the regenerative brake system. In this case, it is desired to reduce the output of the braking pressure intensifying device to a value obtained by subtracting the output of the regenerative brake system from the output of the braking pressure intensifying device. In a brake system composed of a combination of a service brake system and a brake assist system, it is desired to increase the output of the braking pressure intensifying device to intensify the braking force produced by the braking pressure intensifying device in such case that brake assist operation is needed, for example, a case that a driver can not depress a brake pedal enough during the operation of the braking pressure intensifying device so as not to develop predetermined braking force.

When the brake control is performed in a brake maneuver just like the above case, the brake pedal is not influenced even with the travel simulator.

Further, in a brake system for controlling the distance from a front vehicle, it is desired to hold the distance constant by automatically actuating wheel brakes when the distance becomes short during running. In a brake system for avoiding a collision, it is desired to avoid a collision with an obstacle object by automatically actuating wheel brakes when there is a possibility of collision with the obstacle object. Furthermore, in a traction control system, it is desired to cancel a slipping tendency to ensure the secure starting by automatically actuating the brakes of the driving wheels when the driving wheel(s) is in slipping tendency at the starting.

As mentioned above, it is desired that the brake pedal is not influenced when the automatic braking is conducted even with the travel simulator.

Further, it is desired that such a system for controlling the braking force during braking operation or controlling the automatic braking can be manufactured with a simple structure.

Moreover, it is desired that the input-travel characteristic, the input-braking pressure characteristic, or the travel-braking pressure characteristic is allowed to be changed according to the condition of a vehicle or the like, with the structure remaining simple.

SUMMARY OF THE INVENTION

It is an object of the present invention to provide a braking pressure intensifying master cylinder of which the travel characteristic at the input side can be freely changed without the influence of the output side.

It is another object of the present invention to provide a braking pressure intensifying master cylinder with simple structure which can intensify master cylinder pressure to obtain large braking force when necessary.

It is still another object of the present invention to provide a braking pressure intensifying master cylinder which can securely operate even in case of the fluid pressure source failure, and which can be manufactured to be compact at a low cost.

To achieve the aforementioned objects, the present invention provides a braking pressure intensifying master cylinder comprising at least: an input shaft which travels by input applied in braking maneuver; a control valve of which operation is controlled by said input shaft to regulate the fluid pressure of the fluid pressure source to develop fluid pressure corresponding to said input; a pressurized chamber into which the fluid pressure regulated by said control valve is supplied; and a master cylinder piston which is actuated by the fluid pressure supplied into the pressurized chamber to develop master cylinder pressure, wherein said control valve is biased by biasing force of a biasing means in a direction opposite to the operational direction of said input shaft and is biased by the fluid pressure regulated by said control valve in the operational direction of said input shaft, and said input shaft travels such that the force produced by the fluid pressure regulated by said control valve and the biasing force of said biasing means are balanced.

The braking pressure intensifying master cylinder of the present invention is characterized by further comprising a reaction chamber which can communicate with said pressurized chamber and into which the fluid pressure regulated by said control valve can be supplied, wherein the fluid pressure supplied in said reaction chamber acts on said input shaft against said input.

The braking pressure intensifying master cylinder of the present invention is also characterized in that said control valve has a valve spool which is slidably disposed to develop said regulated fluid pressure, and said valve spool is biased by the operational force produced by the fluid pressure regulated by said control valve and by the biasing force of said biasing means in directions opposite to each other.

The braking pressure intensifying master cylinder of the present invention is also characterized in that said control valve comprises said valve spool and said input shaft, said valve spool travels such that said biasing force and said operational force are balanced, and said input shaft travels depending on the travel of said valve spool.

The braking pressure intensifying master cylinder of the present invention is also characterized in that said control valve comprises said valve spool and said housing and said input shaft travels such that said biasing force and said operational force which bias said valve spool are balanced.

The braking pressure intensifying master cylinder of the present invention is also characterized by further comprising an electromagnetic shut-off valve for controlling the communication/isolation between said fluid pressure source and said pressurized chamber, an electromagnetic selector valve to be selectively controlled for allowing the communication between said pressurized chamber and said reaction chamber or restricting the communication therebetween by a relieve valve, and a controller for controlling the opening/closing of said electromagnetic shut-off valve and the selection of said electromagnetic selector valve.

The braking pressure intensifying master cylinder of the present invention is also characterized by further comprising a first electromagnetic shut-off valve for controlling the communication/isolation between said fluid pressure source and said pressurized chamber, a second electromagnetic shut-off valve for controlling the communication/isolation between said fluid pressure source and said reaction chamber, and a controller for controlling the opening/closing of said first and second electromagnetic shut-off valves.

The braking pressure intensifying master cylinder of the present invention is also characterized in that said fluid pressure source comprises a pump which is actuated when necessary to discharge hydraulic fluid, and an accumulator in which pressure exceeding a setting value is stored by said pump, and that said first electromagnetic shut-off valve controls the communication/isolation between said pump and said pressurized chamber, and said second electromagnetic shut-off valve controls the communication/isolation between said pump and said reaction chamber, and the communication/isolation between said accumulator and said pressurized chamber is controlled by a third electromagnetic shut-off valve of which opening/closing is controlled by said controller.

The braking pressure intensifying master cylinder of the present invention is also characterized by further comprising an electromagnetic shut-off valve for controlling the communication/isolation between said fluid pressure source and said pressurized chamber, and a controller for controlling the opening/closing of said electromagnetic shut-off valve.

The braking pressure intensifying master cylinder of the present invention is also characterized in that said fluid pressure source comprises at least an accumulator in which pressure exceeding a setting value is stored and is characterized by further comprises: a first electromagnetic shut-off valve for controlling the communication/isolation between said accumulator and said pressurized chamber, a second electromagnetic shutoff valve for controlling the communication/isolation between said pressurized chamber and said reaction chamber, and a controller for controlling the opening/closing of said first and second electromagnetic shut-off valves.

The braking pressure intensifying master cylinder of the present invention is also characterized in that said master cylinder piston is pressed by said input shaft to develop master cylinder pressure when no fluid pressure is developed in said pressurized chamber due to failure of said fluid pressure source even with travel of said input shaft in a braking maneuver.

According to the braking pressure intensifying MCY of the present invention having the aforementioned construction, the pressure intensifying function is contained in the MCY itself, thus eliminating the need for a booster such as a vacuum booster or a hydraulic booster as conventionally used. Therefore, the entire length of the braking pressure intensifying MCY can be shorter than the length of a combination of a MCY and a booster as the conventional one because of no booster. This also enables to facilitate the structure of the brake system and improve the flexibility for installation of the braking pressure intensifying MCY.

The input shaft and the master cylinder piston can be operated separately from each other when operated and the input shaft travels such that the fluid pressure regulated by the control valve and the biasing force of the biasing means are balanced so that the control valve can function as a travel simulator.

The pressurized chamber and the reaction chamber can be isolated from each other, whereby fluid pressure of the fluid pressure source can be supplied to the pressurized chamber independently from the reaction chamber. This enables the regenerative brake coordination control, the automatic brake control, the auto cruise compensation control, and/or the brake assist control.

The control valve has a valve spool and the input shaft travels such that the operational force produced by the fluid pressure regulated by the control valve and the biasing force of the biasing means are balanced, whereby the valve spool can function as a travel simulator.

By changing the pressure receiving area of the control valve on which fluid pressure regulated by the control valve acts and/or changing the biasing force of the biasing means, the travel characteristic of the input shaft as the input side can be freely changed independently from the output side, without influence on the master cylinder pressure as the output side of the braking pressure intensifying MCY.

Because the travel characteristic of the input shaft is not influenced by the master cylinder pressure, the operational feel is improved.

The travel simulator is built in the braking pressure intensifying master cylinder, that is, no external simulator is necessary, thereby allowing compact design of the braking pressure intensifying MCY.

When the electromagnetic selector valve is selected in the pressure-regulating position by the controller, the fluid pressure of the reaction chamber should be lower than the fluid pressure of the pressurized chamber by an amount corresponding to the relief pressure of the relief valve, whereby the braking pressure intensifying MCY can exhibit jumping characteristic.

The braking pressure intensifying MCY of the present invention may be applied to an open-center type MCY. In this case, when a predetermined period of time has passed after the input shaft starts to travel in a braking maneuver, the controller opens the second electromagnetic shut-off valve, whereby the braking pressure intensifying MCY can exhibit jumping characteristic.

The controller controls the opening/closing of the first and second electromagnetic shut-off valves based on information indicating operational condition of regenerative braking, whereby the braking pressure intensifying MCY is operated to coordinate the operation of the regenerative braking so as to obtain optimal braking force as a whole corresponding to the braking force generated by the regenerative braking.

Further, the controller controls the opening/closing of the first through third electromagnetic shut-off valves based on information for actuating automatic braking, information for controlling the operation of the braking for holding the vehicle to run at a constant speed, and/or information for controlling the braking for brake assist, whereby the braking pressure intensifying MCY is operated to conduct the automatic brake control, the auto cruise compensation control, and/or the brake assist control.

The braking pressure intensifying MCY of the present invention may be applied to a closed-center type MCY. When a predetermined period of time has passed after the input shaft starts to travel in a braking maneuver, the controller opens the second electromagnetic shut-off valve, whereby the braking pressure intensifying MCY can exhibit jumping characteristic. The controller controls the opening/closing of the first electromagnetic shut-off valve and the second electromagnetic shut-off valve based on information indicating operational condition of regenerative braking, information for actuating automatic braking, information for controlling the operation of the braking for holding the vehicle to run at a constant speed, and/or information for controlling the braking for brake assist, whereby the braking pressure intensifying MCY is operated to conduct the regenerative brake coordination control, the automatic brake control, the auto cruise compensation control, and/or the brake assist control.

According to the present invention, the master cylinder piston can be directly operated by the input of the input shaft when no fluid pressure is developed in the pressurized chamber due to the failure of the fluid pressure source. Therefore, the wheel brakes can be securely actuated whenever no fluid pressure is developed in the pressurized chamber due to the failure of fluid pressure source.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
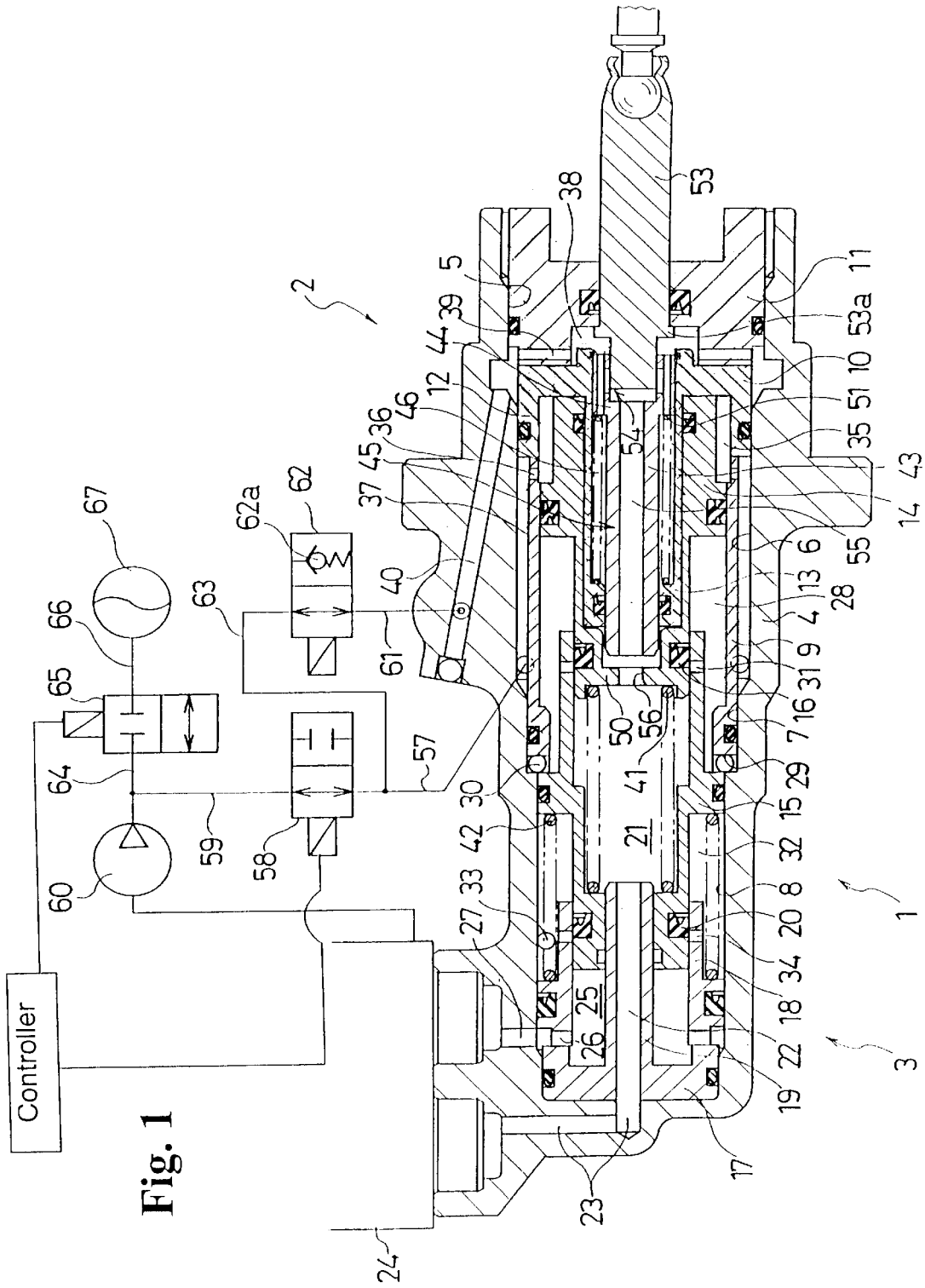
FIG. 1 is a sectional view showing a braking pressure intensifying master cylinder to which a first embodiment of the pressure intensifying master cylinder of the present invention is applied.
Figure 2:
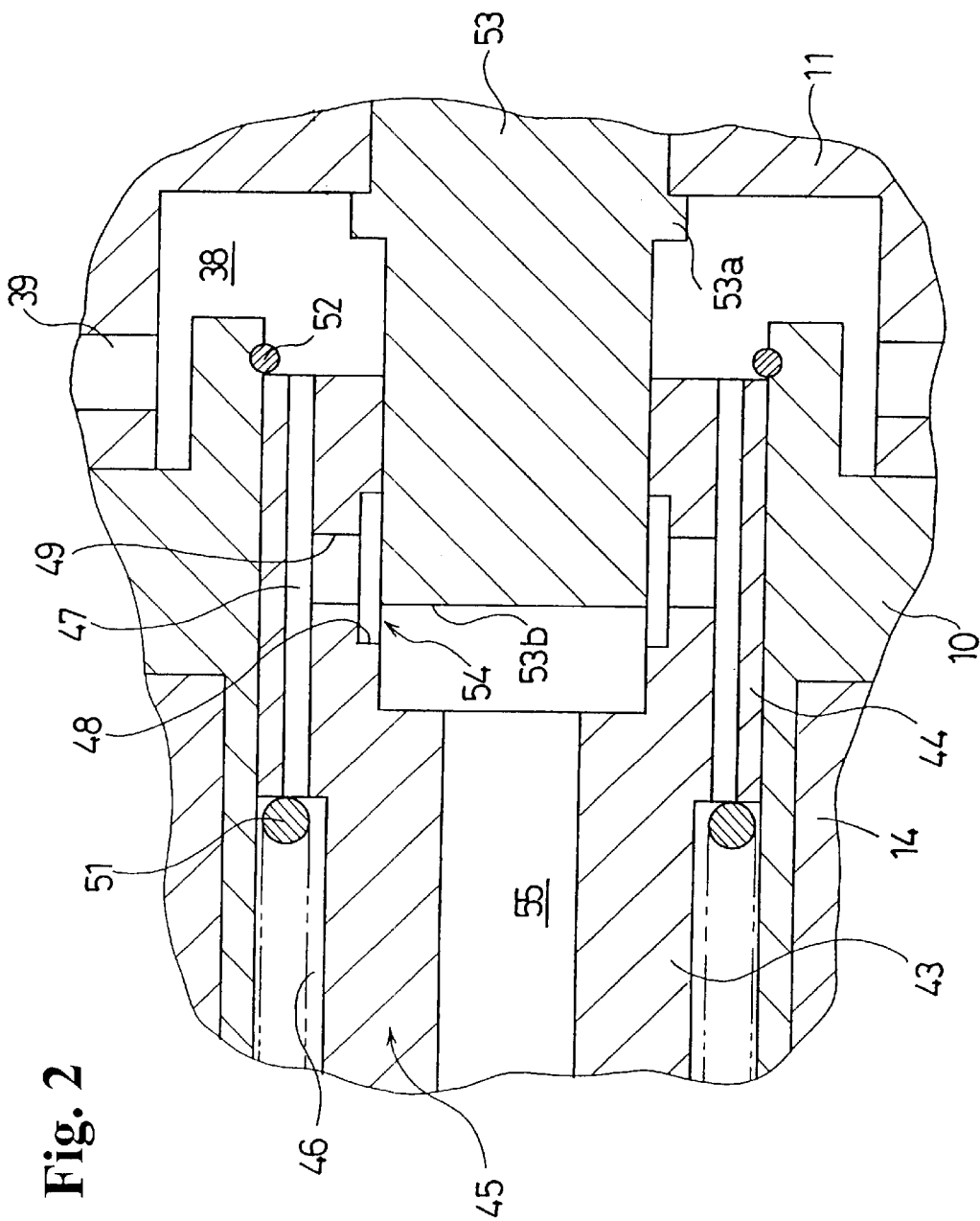
FIG. 2 is a partially enlarged sectional view showing an intensification control section of the pressure intensifying master cylinder shown in FIG. 1.

FIG. 1 is a sectional view showing a braking pressure intensifying master cylinder to which the first embodiment of the pressure intensifying master cylinder of the present invention is applied, FIG. 2 is a partially enlarged sectional view showing an intensification control section of the pressure intensifying master cylinder shown in FIG. 1. In the following description, the terms such as "front or forward" and "rear or back" refer to the left and the right, respectively, in the drawings.

As shown in FIG. 1 and FIG. 2, a braking pressure intensifying master cylinder 1 of the first embodiment is of an open-center type having an open-center type control valve and comprises an intensification control section 2 which develops fluid pressure regulated based on the input force applied through a brake operational member such as a brake pedal, and a master cylinder pressure producing section 3 which produces MCY pressure intensified with the fluid pressure regulated in the intensification control section 2.

The braking pressure intensifying master cylinder 1 has a housing 4. The housing 4 is provided therein with a stepped bore composed of a first bore 5 opening the right end of the housing 4, a second bore 6 formed successively from the left end of the first bore 5 and having a diameter smaller than that of the first bore 5, a third bore 7 formed successively from the left end of the second bore 6 and having a diameter smaller than that of the second bore 6, and a fourth bore 8 formed successively from the left end of the third bore 7 and having a diameter smaller than that of the third bore 7. In the stepped bore, a first cylindrical member 9 is fluid-tightly fitted in the third bore 7 and a second cylindrical member 10 is fluid-tightly fitted in the second bore 6. The first and second cylindrical members 9, 10 are stopped from moving in the longitudinal direction by a plug 11 fluid-tightly closing the right end of the first bore 5. The second cylindrical member 10 includes an outer cylindrical portion 12 and an inner cylindrical portion 13 disposed coaxially with each other.

A cylindrical primary piston 14 is received in a space defined by the first cylindrical member 9, the outer cylindrical portion 12 of the second cylindrical member 10, and the inner cylindrical portion 13 of the second cylindrical member 10. The primary piston 14 has a large-diameter portion at the middle in the longitudinal direction thereof. The outer periphery of the large-diameter portion is in a fluid-tight and slidable relation to the inner periphery of the first cylindrical member 9, while the inner periphery of the primary piston 14 is in a fluid-tight and slidable relation to the outer periphery of the inner cylindrical portion 13 of the second cylindrical member 10.

A cylindrical secondary piston 15 is received in the fourth bore 8 and in the first cylindrical member 9. The secondary piston 15 has a large-diameter portion at the middle in the longitudinal direction thereof. The outer periphery of the large-diameter portion is in a fluid-tight and slidable relation to the inner periphery of the fourth bore 8. The rear end portion of the secondary piston 15 is inserted in the first cylindrical member 9. Fluid-tightly and slidably fitted in the bore of the rear end portion of the secondary piston 15 is a small-diameter front end portion of the primary piston 14 through a first cup seal 16.

Also fluid-tightly fitted and fixed in the fourth bore 8 is a third cylindrical member 17 which has an outer cylindrical portion 18 and an inner cylindrical portion 19 disposed coaxially with each other. The outer periphery of a small-diameter front end portion of the secondary piston 15 is in a fluid-tight and slidable relation to the inner periphery of the outer cylindrical portion 18 through a second cup seal 20, while the inner periphery of the secondary piston 15 is in a fluid-tight and slidable relation to the outer periphery of the inner cylindrical portion 19 of the third cylindrical member 17.

The outer diameters of the respective large-diameter portions of the primary piston 14 and the secondary piston 15 are set to be equal to each other. The outer diameters of the respective small-diameter front end portions of the primary piston 14 and the secondary piston 15 are set to be equal to each other.

Defined between the front end of the primary piston 14 and the secondary piston 15 is a first atmospheric pressure chamber 21. The first atmospheric pressure chamber 21 is always in communication with a reservoir 24 through an axial bore 22 of the inner cylindrical portion 19 of the third cylindrical member 17 and a passage 23 formed in the housing 4 and connected to the axial bore 22. Defined between the front end of the secondary piston 15 and the third cylindrical member 17 is a second atmospheric pressure chamber 25. The second atmospheric pressure chamber 25 is always in communication with the reservoir 24 through a radial holes 26 of the outer cylindrical portion 18 of the third cylindrical member 17 and a passage 27 formed in the housing 4 and connected to the radial holes 26.

Defined by the inner periphery of the first cylindrical member 9, the primary piston 14, and the rear end of the secondary piston 15 is a first MCY pressure chamber 28. The first MCY pressure chamber 28 is always in communication with wheel cylinders of a first brake circuit not shown through radial gaps 29 formed in the front end of the first cylindrical member 9 and passages 30 formed in the housing 4. Formed in a rear end portion of the secondary piston 15 are radial holes 31 which are always in communication with the first MCY pressure chamber 28. When the first cup seal 16 is positioned behind the radial holes 31 as shown in FIG. 1, the radial holes 31 communicate with the first atmospheric pressure chamber 21 so as to allow the communication between the first MCY pressure chamber 28 and the first atmospheric pressure chamber 21, i.e. the reservoir 2, through the radial holes 31. When the first cup seal 16 is positioned ahead of the radial holes 31, the radial holes 31 are isolated from the first atmospheric pressure chamber 21 so as to interrupt the communication between the first MCY pressure chamber 28 and the first atmospheric pressure chamber 21, i.e. the reservoir 24.

On the other hand, defined by the inner periphery of the fourth bore 8 of the housing 4, the secondary piston 15, and the rear end of the third cylindrical member 17 is a second MCY pressure chamber 32. The second MCY pressure chamber 32 is always in communication with wheel cylinders of a second brake circuit, not shown, through passages 33 formed in the housing 4. Formed in the rear end of the third cylindrical member 17 are radial holes 34 which are always in communication with the second MCY pressure chamber 32. When the second cup seal 20 is positioned behind the radial holes 34 as shown in FIG. 1, the radial holes 34 communicate with the second atmospheric pressure chamber 25 so that the second MCY pressure chamber 32 communicates with the second atmospheric pressure chamber 25 through the radial holes 34 i.e. with the reservoir 24. When the second cup seal 20 is positioned ahead of the radial holes 34, the radial holes 34 are isolated from the second atmospheric pressure chamber 25 so as to interrupt the communication between the second MCY pressure chamber 32 and the second atmospheric pressure chamber 25, i.e. the reservoir 24.

Defined by the inner periphery of the outer cylindrical portion 12 of the second cylindrical member 10, the rear end of the primary piston 14, and the second cylindrical member 10 is a pressurized chamber 35. The pressurized chamber 35 is always in communication with an annular passage 37, formed between the inner periphery of the second bore 6 of the housing 4 and the outer periphery of the first cylindrical member 9, through radial holes 36, formed in the first cylindrical member 9. Defined between the rear end of the second cylindrical member 10 and the front end of the plug 11 is a reaction chamber 38. The reaction chamber 38 is always in communication with a passage 40 formed in the housing 4 through radial holes 39 formed in the plug 11.

Inside the first atmospheric pressure chamber 21, a first return spring 41 is disposed in the compressed state between the primary piston 14 and the secondary piston 15. The primary piston 14 is always biased in the backward direction by the spring force of the first return spring 41. In the inoperative condition, the primary piston 14 is in the rear-most position where the rear end of the primary piston 14 is in contact with the second cylindrical member 10 as shown in FIG. 1. In this state, the first cup seal 16 is positioned behind the radial holes 31 and the first MCY pressure chamber 28 communicates with the reservoir 24 through the first atmospheric pressure chamber 21. Inside the second MCY pressure chamber 32, a second return spring 42 is disposed in the compressed state between the secondary piston 15 and the third cylindrical member 17. The secondary piston 15 is always biased in the backward direction by the spring force of the second return spring 42. In the inoperative condition, the secondary piston 15 is in the rear-most position where the rear end of the secondary piston 15 is in contact with the front end of the first cylindrical member 9 as shown in FIG. 1. In this state, the second cup seal 20 is positioned behind the radial holes 34 and the second MCY pressure chamber 32 communicates with the reservoir 24 through the second atmospheric pressure chamber 25.

A stepped spool (corresponding to the valve spool of this invention) 45 composed of a small-diameter portion 43 and a large-diameter portion 44 is disposed coaxially with the inner cylindrical portion 13 of the second cylindrical member 10. The small-diameter portion 43 is fluid-tightly and slidably inserted through the second cylindrical member 10, while the large-diameter portion 44 is slidably fitted in the inner cylindrical portion 13. The rear end of the large-diameter portion 44 faces the reaction chamber 38 and the front end of the large-diameter portion 44 faces a spring chamber 46 which is defined between the outer periphery of the small-diameter portion 43 and the inner periphery of the inner cylindrical portion 13 of the second cylindrical member 10 and in which a spring (corresponding to the biasing means of the present invention) 51, described later, is housed. The large-diameter portion 44 has axial holes 47 axially extending through the large-diameter portion 44 so as to always allow the communication between the reaction chamber 38 and the spring chamber 46, and an annular groove 48 formed in the inner periphery of the large-diameter portion 44. The axial holes and the annular groove 48 are always in communication with each other through radial holes 49. As will be described later, a front end portion of an input shaft 53 is inserted into the large-diameter portion 44. The inner diameter of the axial bore of the stepped spool 45 at the portion into which the front end portion of the input shaft 53 is inserted is smaller than the outer diameter of the small-diameter portion 43 so that the pressure receiving area on the reaction chamber 38 side of the large-diameter portion 44 is greater than the pressure receiving area on the spring chamber 46 side of the large-diameter portion 44. Therefore, when fluid pressure is developed in the respective reaction chamber 38 and the spring chamber 46, this fluid pressure biases the stepped spool 45 forwardly because of a differential between the pressure receiving area on the reaction chamber 38 side of the large-diameter portion 44 and the pressure receiving area on the spring chamber 46 side of the large-diameter portion 44.

The front end of the stepped spool 45 is capable of coming in contact with a radial projection 50 at the front end of the primary piston 14. Further, the spring 51 is disposed in the compressed state between the inner cylindrical portion 13 and the large-diameter portion 44. The stepped spool 45 is always biased by the spring force of the spring 51 in the backward direction, i.e. toward the input shaft 53 described later. In the inoperative condition, the stepped spool 45 is in the rear-most position where the rear end of the stepped spool 45 is in contact with a snap ring 52 held on the second cylindrical member 10.

The front end portion of the input shaft 53 is slidably inserted into the rear end portion of the stepped spool 45. The input shaft 53 is a stepped shaft such that the sectional area of the rear end portion thereof where is slidably inserted through the plug 11 is greater than the sectional area of the front end portion thereof where is slidably inserted into the stepped spool 45. The rear end portion of the input shaft 53 is connected to a brake pedal, not shown, so that the input shaft 53 travels according to the depression of the brake pedal. The input shaft 53 is always biased by the spring force of a return spring, not shown, of the brake pedal in the backward direction. In addition to this return spring, a spring (not shown) is disposed in a compressed state between the stepped spool 45 and the input shaft 53 so that the input shaft is always biased in the backward direction by the spring force of the spring. Furthermore, the input shaft 53 has a flange 53a formed on its outer periphery. The flange 53a comes in contact with the plug 11 as shown in FIGS. 1 and 2 whereby the input shaft 53 is in the rear-most position.

A control valve 54 is composed of the front end 53b of the input shaft 53 and the annular groove 48. Based on the input of the input shaft 53 i.e. the pedal force applied on the brake pedal, the control valve 54 develops fluid pressure according to the pedal force in the pressurized chamber 35 and the reaction chamber 38. The downstream side of the control valve 54 is always in communication with the first atmospheric pressure chamber 21 through an axial bore 55 formed in the stepped spool 45 and an axial bore 56 formed in the front end of the primary piston 14. The annual passage 37 being always in communication with the pressurized chamber 35 is connected to a normally open first electromagnetic shut-off valve 58 (corresponding to the electromagnetic selector valve of the present invention or the first electromagnetic selector valve of the present invention) through a line 57. Further, the first electromagnetic shut-off valve 58 is connected to a discharge side of a pump 60 through a line 59. In this case, the pump 60 sucks hydraulic fluid from the reservoir 24 and discharges the hydraulic fluid.

The passage 40 being always in communication with the reaction chamber 38 is connected to a normally open electromagnetic selector valve 62 through the line 61. The electromagnetic selector valve 62 is provided with two positions, one of which is a communication position as a normal position where the flow of the hydraulic fluid is not limited and the other one of which is a flow-regulating position where a relief valve 62a is provided. The relief valve 62a blocks the flow of the hydraulic fluid from the pump 60 to the reaction chamber 38 when the pump-discharge pressure is under the relief pressure and opens to supply pump-discharge pressure to the reaction chamber 38 when the pump-discharge pressure exceeds the relief pressure. The electromagnetic selector valve 62 is always connected to the line 57 through a line 63. Therefore, when the electromagnetic selector valve 62 is inoperative, the pressurized chamber 35 freely communicates with the reaction chamber 38. When the electromagnetic selector valve 62 is operative, the pressurized chamber 35 communicates with the reaction chamber 38 via the relief valve 62a which opens when the pressure differential between the pressurized chamber 35 and the reaction chamber 38 exceeds the relief pressure.

The line 59 on the discharge side of the pump 60 is connected to a normally closed second electromagnetic shut-off valve 65 through a line 64. The second electromagnetic shut-off valve 65 is connected to an accumulator 67, in which fluid pressure for aiding the increase in the pump-discharge pressure is stored, through a line 66. The accumulator 67 is just for aiding the increase in the pump-discharge pressure so that the capacity of stored pressure is set relatively low.

The control for switching off and on the first and second electromagnetic shut-off valves 58, 65 and the control for driving the pump 60 are conducted by a central processing unit (CPU), not shown, based on detected signals from a pedal depression detection sensor, not shown, for detecting a depression of the brake pedal and an accumulator pressure detection sensor for detecting the pressure stored in the accumulator 67. That is, the control for switching off and on the first and second electromagnetic shut-off valves 58, 65 and the control for driving the pump 60 are conducted by the CPU when necessary. The electromagnetic selector valve 62 is controlled to be set in the flow-regulating position according to the detected signal of the pedal depression detection sensor by the CPU. In this case, the pump 60 constitutes the pressure source of the present invention, while the pump 60 and the accumulator 67 cooperate to constitute the pressure source in the first embodiment.

Hereinafter, description will now be made as regard to the operation of the pressure intensifying master cylinder 1 of the first embodiment having the aforementioned structure.

As the pressure stored in the accumulator 67 is lowered below a preset value, based on the detected signal from the accumulator pressure detection sensor, the CPU closes the first electromagnetic shut-off valve 58, opens the second electromagnetic shut-off valve 65, and drives the pump 60 whereby the discharge pressure of the pump 60 is accumulated in the accumulator 67. As the pressure stored in the accumulator 67 exceeds the preset value, the CPU opens the first electromagnetic shut-off valve 58, closes the second electromagnetic shut-off valve 65, and stops the drive of the pump 60 whereby the pressure accumulation for the accumulator 67 is stopped. Therefore, the pressure stored in the accumulator 67 is kept to be equal to or higher than the preset value. The CPU may periodically control the operation of the first and second electromagnetic shut-off valves 58, 65 and the pump 60 so as to achieve the periodic accumulation to the accumulator 67. In addition, combinations of the periodic accumulation and the accumulation based on the preset value may be conducted so as to keep the pressure stored in the accumulator not less than the preset value.

When the brake pedal is not depressed i.e. the pressure intensifying master cylinder 1 is inoperative, the primary piston 14, the secondary piston 15, the stepped spool 45, and the input shaft 53 are in their rear-most positions as shown in FIG. 1. Also as shown, the first electromagnetic shutoff valve 58 is opened, the electromagnetic selector valve 62 is set in the communication position, and the second electromagnetic shut-off valve 65 is closed.

In this illustrated state, the valve opening rate of the control valve 54 is the maximum so that the reaction chamber 38 and the spring chamber 46 communicate with the first atmospheric pressure chamber 21 through the axial holes 47, the radial holes 49, the annular groove 48, a space between the front end 53b of the input shaft 53 and the annular groove 48, the axial bore 55, and the axial bore 56. That is, the reaction chamber 38 and the spring chamber 46 communicate with the reservoir 24 through the maximum opening of the control valve 54. Further, the pressurized chamber 35 is connected to the reaction chamber 38 through the electromagnetic selector valve 62. The first MCY pressure chamber 28 communicates with the first atmospheric pressure chamber 21 through the radial holes 31 of the secondary piston 15 while the second MCY pressure chamber 32 communicates with the second atmospheric pressure chamber 25 through the radial holes 34 of the third cylindrical member 17. Accordingly, when the pressure intensifying master cylinder 1 is inoperative, the first MCY pressure chamber 28, the second MCY pressure chamber 32, the pressurized chamber 35, the reaction chamber 38, and the spring chamber 46 are all at the atmospheric pressure.

As the brake pedal is depressed, the depression of the brake pedal is detected by the pedal depression detection sensor whereby the CPU drives the pump 60, at the same time, sets the electromagnetic selector valve 62 to the flow-regulating position, and opens the second electromagnetic shut-off valve 65. Then, the pump 60 discharges the hydraulic fluid from the reservoir 24. Since the electromagnetic selector valve 62 is set in the flow-regulating position, the pressurized chamber 35 is substantially isolated from the reaction chamber 38 so that the discharge side of the pump 60 including the pressure chamber 35 is now a defined space sealed from the outside. Therefore, pump-discharge pressure is developed within this sealed space. Because of the pump-discharge pressure, fluid pressure is developed in the pressurized chamber 35. In addition, since the second electromagnetic shut-off valve 65 is opened, the pressure stored in the accumulator 67 is supplied to the pressurized chamber 35. As a result of this, the rise delay of the fluid pressure in the pressurized chamber 35 due to the rise delay of the pump-discharge pressure just after the start of the pump 60 can be compensated whereby the fluid pressure of the pressurized chamber 35 rises relatively rapidly.

Because of the fluid pressure in the pressurized chamber 35, the primary piston 14 moves forward so that the first cup seal 16 on the front end portion of the primary piston 14 passes by the radial holes 31 and is thus positioned ahead of the radial holes 31. Thus, the first MCY pressure chamber 28 is isolated from the first atmospheric pressure chamber 21. Because of this isolation and the forward movement of the primary piston 14, MCY pressure is developed in the first MCY pressure chamber 28.

Because of the MCY pressure in the first MCY pressure chamber 28, the secondary piston 15 moves forward so that the second cup seal 20 on the front end portion of the secondary piston 15 passes the radial holes 34 and is thus positioned ahead of the radial holes 34. Thus, the second MCY pressure chamber 32 is isolated from the second atmospheric pressure chamber 25. Because of this isolation and the forward movement of the secondary piston 15, MCY pressure is developed in the second MCY pressure chamber 32. On the other hand, since the electromagnetic selector valve 62 is in flow-regulating position, no fluid pressure is developed in the reaction chamber 38 because no pump-discharge pressure is supplied to the reaction chamber 38 when the fluid pressure in the pressurized chamber 35 is lower than the relief pressure of the relief valve 62a. Therefore, reaction force due to the fluid pressure in the reaction chamber 38 is not applied to the input shaft 53 until the fluid pressure in the pressurized chamber 35 exceeds the relief pressure after the brake pedal is depressed (i.e. the input shaft 53 starts to travel). The MCY pressure rises regardless of the input of the input shaft 53. This means that the pressure intensifying master cylinder 1 exhibits so-called jamming characteristics.

After the brake pedal is depressed for a predetermined period of time, the second electromagnetic shut-off valve 65 is closed so as to isolate the accumulator 67 from the pressurized chamber 35. As the pump-discharge pressure exceeds the relief pressure, hydraulic fluid discharged from the pump 60 is allowed to flow into the reaction chamber 38 through the electromagnetic selector valve 62. Further, the hydraulic fluid returns to the reservoir 24 from the reaction chamber 38 through the axial holes 47, the radial holes 49, the axial groove 48, the space between the axial groove 48 and the front end 53b of the input shaft 53, the axial bore 55, the axial bore 56, the first atmospheric pressure chamber 21, the axial bore 22, and the passage 23. During this, since the input shaft 53 travels forward according to the depression of the brake pedal, the space between the annual groove 48 and the front end 53b of the input shaft 53 is reduced. This means that the valve opening rate of the control valve 54 is reduced so that the hydraulic fluid flowing through this space is throttled, thereby developing fluid pressure in the reaction chamber 38 and the spring chamber 46. The pressure developed in the reaction chamber 38 and the pressure developed in the spring chamber 46 are equal to each other. The fluid pressure of the reaction chamber 38 is controlled such that the reaction force applied to the input shaft 53 by this fluid pressure balances with the input of the input shaft 53. That is, the fluid pressure in the reaction chamber 38 is controlled according to the input of the input shaft 53.

On the other hand, as the fluid pressure is developed in the reaction chamber 38 and the spring chamber 46, the stepped spool 45 is pressed forward against the spring force of the spring 51 by the action of the fluid pressure because of the differential between the pressure receiving area on the reaction chamber 38 side of the large-diameter portion 44 and the pressure receiving area on the spring chamber 46 side of the large-diameter portion 44. The stepped spool 45 travels forward until the action of the fluid pressure to the stepped spool 45 balances with the spring force of the spring 51. According to the froward travel of the stepped spool 45, the input shaft 53 travels forward. That is, the input shaft 53 travels forward regardless of the forward travel of the primary piston 14. This means that the input side and the output side of the pressure intensifying MCY are separated from each other and the pressure intensifying MCY also functions as a travel simulator. Because of this function as the travel simulator, the input shaft 53 can securely travel even though the input side and the output side of the pressure intensifying MCY are separated from each other.

At this point, the fluid pressure in the pressurized chamber 35 is greater than the fluid pressure in the reaction chamber 38 by the relief pressure of the electromagnetic selector valve 62. Since the fluid pressure in the reaction chamber 38 is controlled to a value corresponding to the input of the input shaft 53 or the pedal force applied to the brake pedal, the fluid pressure of the pressurized chamber 35 connected to the reaction chamber 38 through the electromagnetic selector valve 62 is also controlled to a value corresponding to the pedal force applied to the brake pedal. Accordingly, the MCY pressure developed in the first MCY pressure chamber 28 by the primary piston 14 is controlled to a value intensified corresponding to the pedal force because the primary piston 14 is operated by the fluid pressure in the pressurized chamber 35. In addition, the MCY pressure developed in the second MCY pressure chamber 32 is controlled to a value intensified corresponding to the pedal force because the secondary piston 15 is operated by the MCY pressure in the first MCY pressure chamber 28.

The MCY pressure in the first and second MCY pressure chambers 28, 32 is supplied to the wheel cylinders of two brake circuits, respectively, through the passages 30, 33, respectively so as to operate wheel cylinders, thereby actuating the wheel brakes. Since the outer diameters of the large-diameter portions of the primary piston 14 and the secondary piston 15 at the respective middles in the longitudinal direction thereof are equal to each other and the outer diameters of the front end small-diameter portions of the primary piston 14 and the secondary piston 15 are equal to each other, the MCY pressure in the first MCY pressure chamber 28 and the MCY pressure in the second MCY pressure chamber 32 are equal to each other. As a result of this, the braking forces of the two brake circuits are equal to each other.

As the brake pedal is released, the drive of the pump 60 is stopped, the electromagnetic selector valve 62 is switched to the communication position, and the input shaft 53 is moved backward, whereby the pump 60 no more discharges hydraulic fluid and the space between the annular groove 48 and the front end 53b of the input shaft 53 i.e. the valve opening rate of the control valve 54 is increased. Then, the fluid pressure of the reaction chamber 38 is returned to the reservoir 24 through the axial holes 47, the radial holes 49, the annular groove 48, the space between the annular groove 48 and the front end 53b of the input shaft 53, the axial bore 55, the axial bore 56, the first atmospheric pressure chamber 21, the axial bore 22, and the passage 23, thereby reducing the fluid pressure of the reaction chamber 38. The reduction in the fluid pressure of the reaction chamber 38 leads to the reduction in the fluid pressure of the pressurized chamber 35. Accordingly, the primary piston 14 is moved backwards by the spring force of the first return spring 41 and the MCY pressure of the first MCY pressure chamber 28, thereby reducing the MCY pressure of the first MCY pressure chamber 28. Accordingly, the secondary piston 15 is moved backwards by the spring force of the second return spring 42 and the MCY pressure of the second MCY pressure chamber 32, thereby reducing the MCY pressure of the second MCY pressure chamber 32.

As the first cup seal 16 moves to a position behind the radial holes 31 according to the backward movement of the primary piston 14, the first MCY pressure chamber 28 communicates with the first atmospheric pressure chamber 21. In addition, as the second cup seal 20 moves to a position behind the radial holes 34 according to the backward movement of the secondary piston 15, the second MCY pressure chamber 32 communicates with the second atmospheric pressure chamber 25. The MCY pressure of both the first and second MCY pressure chambers 28, 32 is returned to the reservoir 24. As the primary piston 14, the secondary piston 15, the stepped spool 45, and the input shaft 53 are in the respective rear-most positions as illustrated, the first and second MCY pressure chambers 28, 32, the pressurized chamber 35, and the reaction chamber 38 are at atmospheric pressure so that the pressure intensifying master cylinder 1 becomes in the inoperative state, thereby canceling the braking.

When, although the input shaft 53 travels according to depression of the brake pedal or braking maneuver, no fluid pressure is developed in the pressurized chamber 35 due to a failure of the fluid pressure source such as the pump 60 or the first or second electromagnetic shut-off valve 58, 65, the brake pedal should be depressed largely to move forwards the input shaft 53 largely so that the input shaft 53 comes in contact with the stepped spool 45 and presses the same. Further depression of the brake pedal moves the stepped spool 45 so that the front end of the stepped spool 45 comes in contact with the radial projection 50 of the front end of the primary piston 14 and presses the same, thereby moving forward the primary piston 14. Therefore, MCY pressure is developed in the first MCY pressure chamber 28 in the same manner as described above. Because of the MCY pressure, the secondary piston 15 is moved forwards, whereby MCY pressure is developed in the second MCY pressure chamber 32. The MCY pressure of the first and second MCY pressure chambers 28, 32 is supplied to the wheel cylinders of the two brake circuits, thereby actuating the wheel brakes in the same manner as described above. In this manner, the wheel brakes can be securely actuated whenever no fluid pressure is developed due to the failure of fluid pressure source.

Even when the pump 60 fails, the first and second electromagnetic shut-off valves 58, 65 and the accumulator 67 may be normal and a predetermined pressure may be still stored in the accumulator 67. In this case, the second electromagnetic shut-off valve 65 is opened during depression of the brake pedal so that the stored pressure in the accumulator 67 is supplied to the pressurized chamber 35. As a result, the primary piston 14 is operated by the fluid pressure of the pressurized chamber 35. The braking pressure can be intensified only by an amount corresponding to the stored pressure of the accumulator 67. Therefore, the operation of the wheel brakes can be ensured even when the pump 60 fails.

According to the braking pressure intensifying MCY 1, the pressure intensifying function is contained in the MCY itself as mentioned above, thus eliminating the need for a booster such as a vacuum booster or a hydraulic booster as conventionally used. Therefore, the entire length of the braking pressure intensifying MCY 1 can be shorter than the length of a combination of a MCY and a booster as the conventional one because of no booster. This also enables to facilitate the structure of the brake system and improve the flexibility for installation of the braking pressure intensifying MCY 1.

The stepped spool 45 functions as a pedal travel simulator by separately operating the input shaft 53 and the primary piston 14 and moving the stepped spool 45 in such a manner that the force produced by fluid pressure regulated by the control valve 54 and the spring force of the spring 51 are balanced. Therefore, by changing the pressure receiving areas of the stepped spool 45 and the setting of spring force of the spring 51, the travel characteristic of the input shaft 53 or the input side can be freely changed indecently from the output side without influencing the MCY pressure on the output side of the braking pressure intensifying MCY 1.

Because the travel characteristic of the input shaft 53 is not influenced by the MCY pressure, the operational feel is improved.

The travel simulator is built in the braking pressure intensifying MCY 1, that is, no external simulator is necessary, thereby achieving compact design of the braking pressure intensifying MCY 1.

In case of failure of fluid pressure source, the input of the input shaft 53 i.e. the pedal force can be directly transmitted to and operate the primary piston 14 without magnification. Accordingly, even in the event of such failure of fluid pressure source, the brake system can securely actuate the wheel brakes.

It should be noted that the present invention is not limited to the first embodiment. For example, the first and second electromagnetic shutoff valves 58, 65 and the accumulator 67 can be omitted if pressure rising delay of the pump discharge pressure at the start of braking operation is not a problem. Since, in particular, the braking pressure intensifying MCY 1 of the first embodiment employs the control valve 54 of the open-center type, the accumulator 67 is not essential. The accumulator 67 of the first embodiment is just for preventing the pressure rising delay of the pump discharge pressure. The electromagnetic selector valve 62 can be omitted if the jumping characteristic is not required.

Figure 3:
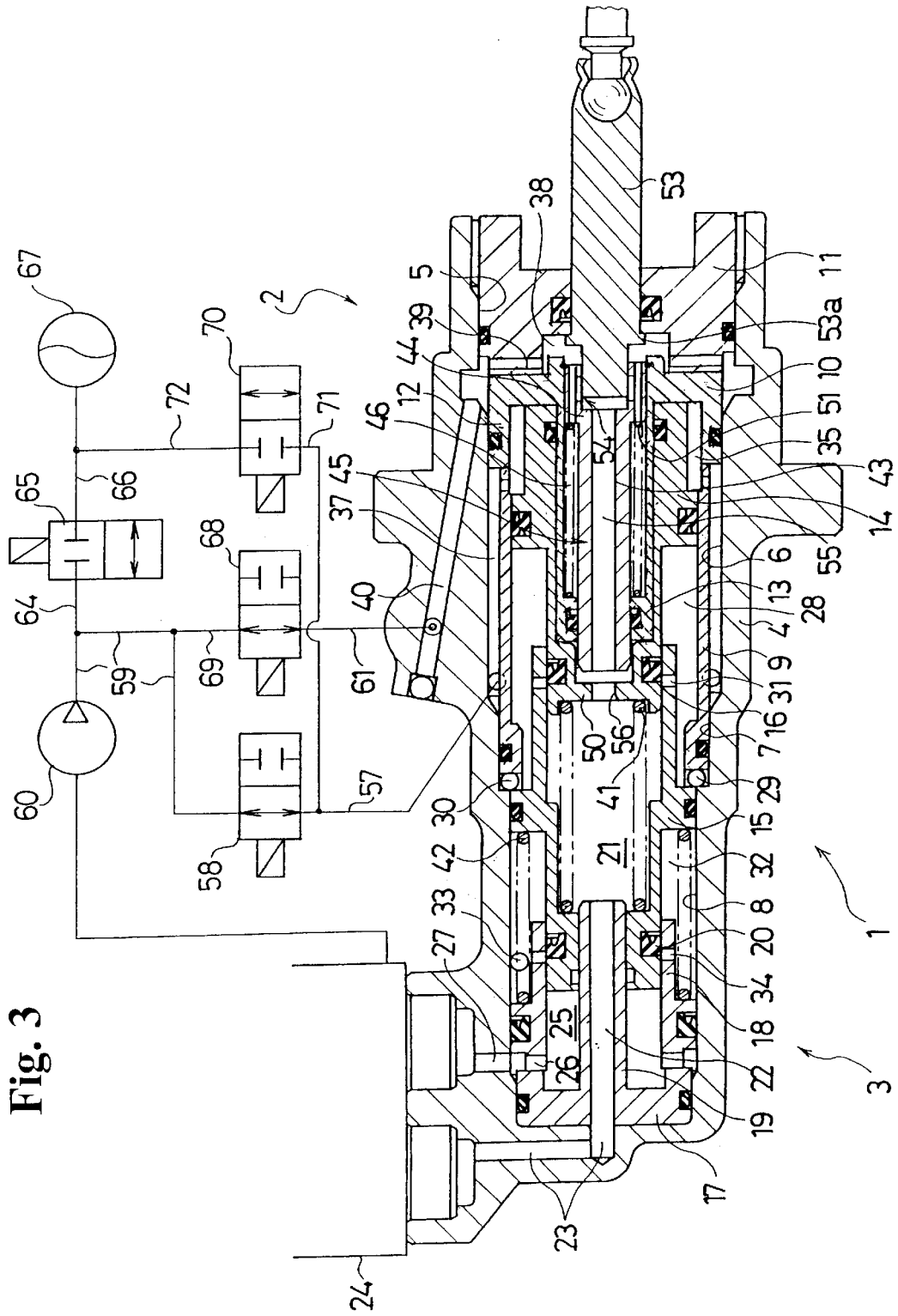
FIG. 3 is a sectional view similar to FIG. 1, but showing a braking pressure intensifying MCY according to a second embodiment of the present invention.

FIG. 3 is a sectional view similar to FIG. 1, but showing a braking pressure intensifying MCY of a second embodiment according to the present invention. Throughout the following embodiments, corresponding component parts are designated with the same reference numerals utilized in the prior embodiment(s), thus omitting the detailed descriptions of such component parts.

As shown in FIG. 3, the braking pressure intensifying MCY 1 of the second embodiment does not have an electromagnetic selector valve 62 and a line 63 employed in the first embodiment and has a normally-open, third electromagnetic shut-off valve 68 (corresponding to the second electromagnetic shut-off valve of the present invention) instead of the electromagnetic selector valve 62 and the line 63. The third electromagnetic shut-off valve 68 is always connected to a passage 40 through a line 61 and is connected to a line 59 through a line 69. The braking pressure intensifying MCY 1 of this embodiment has a normally-closed, fourth electromagnetic shut-off valve 70 (corresponding to the third electromagnetic shut-off valve of the present invention) which is always connected to a line 57 through a line 71 and is always connected to a line 66 through a line 72. In the second embodiment, a pump 60 and an accumulator 67 cooperate to compose the fluid pressure source of the present invention.

The accumulator 67 has pressure storing capacity which is significantly larger than that of the accumulator of the first embodiment. Always stored in the accumulator 67 of the second embodiment is at least such fluid pressure capable of actuating automatic braking.

In a case of employing a regenerative brake coordination system, a CPU receives information of operation of the regenerative braking. Based on the received information, the CPU controls the first and third electromagnetic shut-off valves 58, 68 to coordinate the regenerative braking such that the braking pressure intensifying MCY 1 is operated so as to obtain optimal braking force as a whole corresponding to the braking force generated by the regenerative braking.

In case of employing an automatic brake system, the CPU receives information for activating the automatic braking. Based on the received information, the CPU determines whether the conditions for activating the automatic braking are satisfied or not. When it is determined that the conditions are satisfied, the CPU closes the first and third electromagnetic shut-off valves 58, 68, opens the fourth electromagnetic shut-off valve 70, and supplies the stored pressure of the accumulator 67 into the pressurized chamber 35 to automatically operate the primary piston 14, thereby actuating the automatic braking.

Further, in case of employing an auto cruise compensation brake system for controlling the vehicle to run at a constant speed, the CPU receives information for activating the braking for remaining the running speed constant. Based on the received information, the CPU controls the activation of the braking by suitably opening and closing the first, third, and fourth electromagnetic shut-off valves 58, 68, and 70 in such a manner as to remain the running speed constant.

Furthermore, in case of employing a brake assist system for obtaining large braking force even when a driver, for example, a beginner or an inexpert driver, can not pedal a brake pedal enough so as not to develop desired braking force, the CPU receives information for activating the braking for brake assist. Based on the received information, the CPU supplies the stored pressure of the accumulator 67 to the pressurized chamber 35 by closing the third electromagnetic shut-off valve 68 and opening the second or fourth electromagnetic valve 65, 70 so that the force for actuating the primary piston 14 is assisted, thereby obtaining desired braking force.

The construction of the braking pressure intensifying MCY 1 of the second embodiment is otherwise the same as that of the first embodiment.

In the braking pressure intensifying MCY 1 of the second embodiment, the third electromagnetic shut-off valve 68 is closed at a predetermined period from the depression of the brake pedal, thereby exhibiting the jumping characteristic.

By suitably controlling the opening/closing of the first through fourth electromagnetic shut-off valves 58, 65, 68, 70, the coordination control for the regenerative braking, the automatic brake control, the auto cruise compensation control, or the brake assist control can be achieved.

The action and effects of the braking pressure intensifying MCY 1 of the second embodiment are otherwise the same as those of the aforementioned first embodiment.

Figure 4:
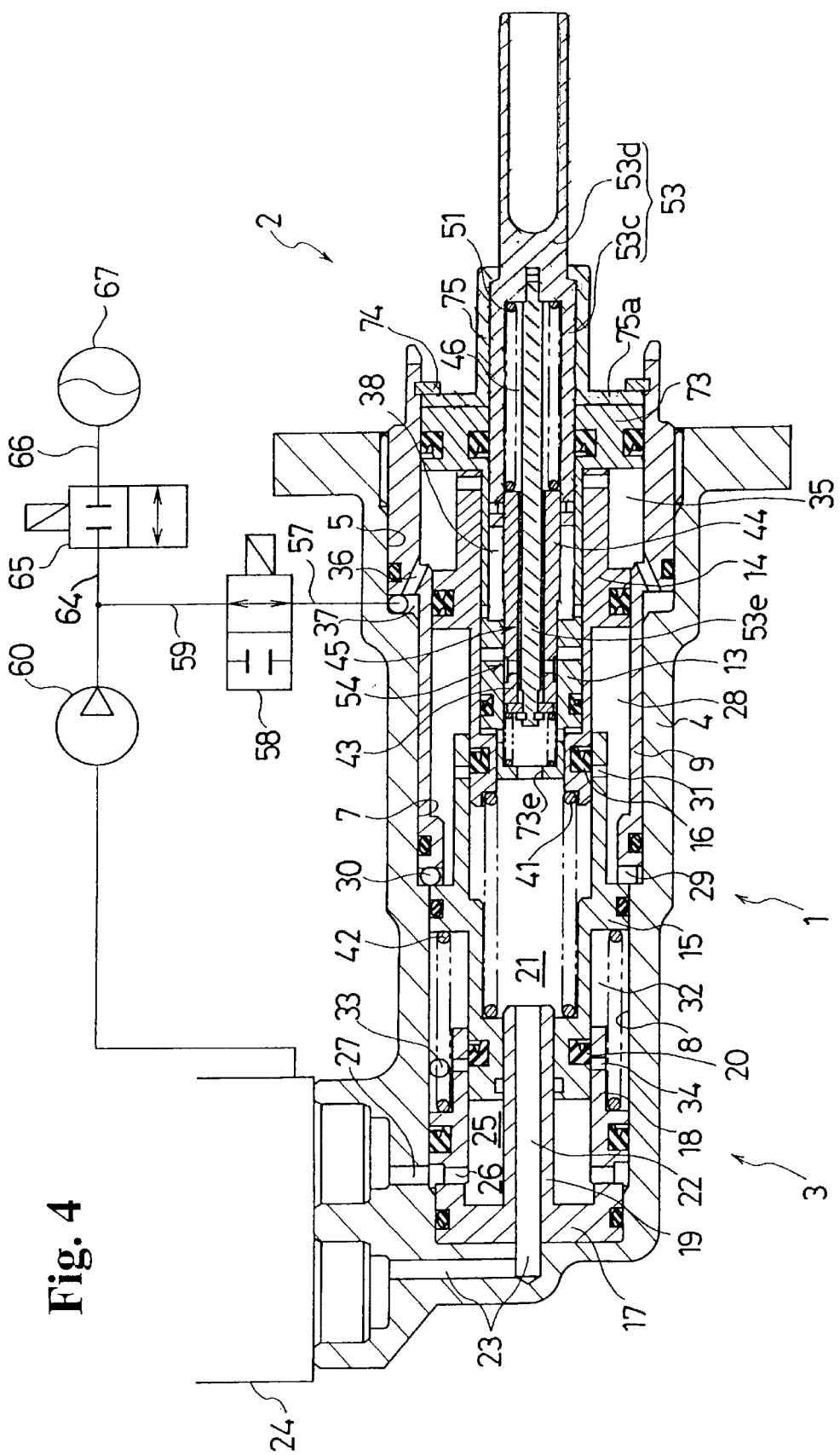
FIG. 4 is a sectional view similar to FIG. 1, but showing a braking pressure intensifying MCY according to a third embodiment of the present invention.
Figure 5:
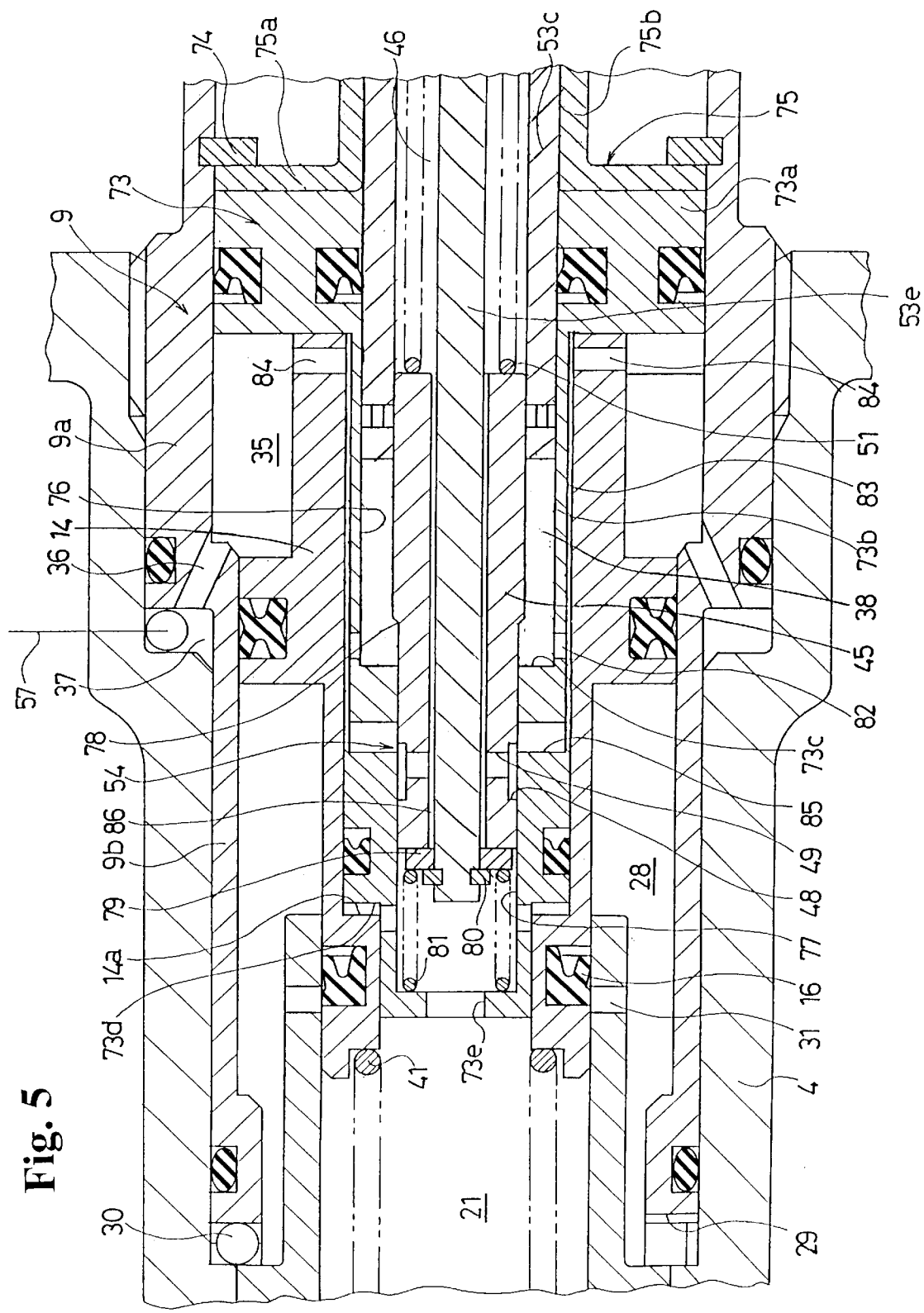
FIG. 5 is a partially enlarged sectional view similar to FIG. 2, but showing an intensification control section of the braking pressure intensifying MCY shown in FIG. 4.

FIG. 4 is a sectional view similar to FIG. 1 but showing a braking pressure intensifying MCY of a third embodiment of the present invention, and FIG. 5 is a partially enlarged sectional view similar to FIG. 2, showing an intensification control section of the braking pressure intensifying MCY shown in FIG. 4.

As shown in FIG. 4 and FIG. 5, the braking pressure intensifying MCY 1 of the third embodiment has an intensification control section 2 of which structure is different from that of the braking pressure intensifying MCY 1 of the first or second embodiment mentioned above, and does not have an electromagnetic selector valve 62 employed in the first embodiment.

In the intensification control section 2 of the third embodiment, the outer cylindrical portion 12 of the second cylindrical member 10 is separately constructed from the rests and is formed integrally with the first cylindrical member 9. That is, the first cylindrical member 9 is a stepped cylindrical member composed of a large-diameter portion 9a (corresponding to the outer cylindrical portion 12) which is fluid-tightly fitted in the first bore 5 of the housing 4 and a small-diameter portion 9b which is fluid-tightly fitted in the second bore 6 of the housing 4. The first cylindrical member 9 is fixed not to move in the longitudinal direction of the housing 4 by screwing the large-diameter portion 9a into the housing 4.

A cylindrical member 73 composed of the rests of the housing side other than the outer cylindrical portion 12 of the second cylindrical member 10 of the first embodiment is received in the first cylindrical member 9. The cylindrical member 73 is a stepped cylindrical member composed of a large-diameter portion 73a and a small-diameter portion 73b (corresponding to the inner cylindrical portion 13 of the second cylindrical member 10 in the first embodiment). The large-diameter portion 73a of the cylindrical member 73 is fluid-tightly and slidably fitted in the large-diameter portion 9a of the first cylindrical member 9. The cylindrical member 73 is biased in the rightward direction through the primary piston 14 by the spring force of the first return spring 41 when the braking pressure intensifying MCY 1 is inoperative. The rear-most position of the cylindrical member 73 is defined because the cylindrical member 73 comes in contact with a flange 75a of a cylindrical stopper 75 of which rightward movement is stopped by a stopper ring 74 fixed to the outer cylindrical portion 12 of the first cylindrical member 9. The small-diameter portion 73b of the cylindrical member 73 has a stepped bore therein comprising a large-diameter bore 76 and a small-diameter bore 77.

An input shaft 53 is a stepped shaft comprising a large-diameter portion 53c at a front end side thereof and a small-diameter portion 53d at a rear-end side thereof. The large-diameter portion 53c is formed in a cylindrical shape. The large-diameter portion 53c of the input shaft 53 is fluid-tightly and slidably fitted in a large-diameter bore 76 of the small-diameter portion 73b of the cylindrical member 73.

A stepped spool 45 has a small-diameter portion 43 which is slidably received in the small-diameter bore 77 of the small-diameter portion 73b of the cylindrical member 73 and a large-diameter portion 44 which is fluid-tightly and slidably received in the cylindrical large-diameter portion 53c of the input shaft 53. Defined between the outer periphery of the stepped spool 45 and the inner periphery of the large-diameter bore 76 of the small-diameter portion 73b of the cylindrical member 73 is a reaction chamber 38. The end of the large-diameter portion 53c of the input shaft 53 faces the reaction chamber 38 and the step 78 between the small-diameter portion 43 and the large-diameter portion 44 of the stepped spool 45 is positioned in the reaction chamber 38.

The input shaft 53 has an extension shaft 53e provided at the center of the large-diameter portion 53c. The extension shaft 53e extends forwards in the longitudinal direction passing through the stepped spool 45, wherein the extension shaft 53e is loosely fitted in the bore of the stepped spool 45. The extension shaft 53e has an annular disk-like stopper 79 on a front end portion thereof. The stopper 79 is slidably disposed in the longitudinal direction so that the stopper 79 can come in contact with the front end of the stepped spool 45 and is limited in its leftward movement by a stopper ring 80 fixed to the front end portion of the extension shaft 53e. Inside the large-diameter portion 53c of the input shaft 53, a spring chamber 46 is formed. Inside the spring chamber 46, a spring 51 is disposed in a compressed state between the input shaft 53 and the rear end of the stepped spool 45. In addition, a spring 81 is disposed in a compressed state between the front end of the cylindrical member 73 and the stopper 79. By the spring force of the spring 81, the stopper 79 is biased backwards. The spring force of the spring 51 is set to be greater than the spring force of the spring 81 so that, in the inoperative state, the front end of the stepped spool 45 comes in contact with the stopper 79 and the stopper 79 comes in contact with the stopper ring 80, whereby further forward movement of the stepped spool 45 is stopped as illustrated.

The reaction chamber 38 is always in communication with the pressurized chamber 35 through radial holes 82 formed in the small diameter portion 73b of the cylindrical member 73 and an annular passage 83 defined between the outer periphery of the small-diameter portion 73b and the inner periphery of the primary piston 14. In a rear end portion of the primary piston 14, radial holes 84 are formed to always allow the communication between the pressurized chamber 35 and the passage 83 so as to ensure the communication between the pressurized chamber 35 and the passage 83 even when the rear end of the primary piston 14 comes in contact with the cylindrical member 73 in the illustrated inoperative state.

In the small-diameter portion 73b of the cylindrical member 73, radial holes 85 are formed to always communicate with the passage 83. The radial holes 85 and an annular groove 48 formed in the stepped spool 45 cooperate to compose a control valve 54. In the illustrated inoperative state, the spaces between the radial holes 85 and the annular groove 48 are set to be the maximum, that is, the valve opening rate of the control valve 54 is the maximum. By forward movement of the stepped spool 45, the spaces between the radial holes 85 and the annular groove 48 are reduced, that is, the valve opening rate of the control valve 54 is reduced, thereby throttling the flow of hydraulic fluid flowing through these spaces.

Formed in the inner periphery of the small-diameter portion 73b of the cylindrical member 73 is a step 73c. By large forward movement of the input shaft 53, the front end of the large-diameter portion 53b of the input shaft 53 comes in contact with the step 73c. After that, the input shaft 53 and the cylindrical member 73 therefore move together. Formed in the outer periphery of a front end portion of the small-diameter portion 73b of the cylindrical member 73 is a step 73d. Formed in the inner periphery of a front end portion of the primary piston 14 is a step 14a. By forward movement of the cylindrical member 73, the step 73d of the cylindrical member 73 comes in contact with the step 14a of the primary piston 14. After that, the cylindrical member 73 and the primary piston 14 therefore move together.

Formed in the front end of the small-diameter portion 73b of the cylindrical member 73 is an axial bore 73e which allows the extension shaft 53e and the stopper ring 80 to pass therethrough.

The construction of the braking pressure intensifying MCY 1 of the third embodiment is otherwise the same as that of the second embodiment.

Now, the action of the pressure intensifying master cylinder 1 of the third embodiment will be described.

In the third embodiment, the spring chamber 46 is always in communication with the first atmospheric chamber 21 through a clearance 86.

When the pressure intensifying master cylinder 1 is inoperative, the primary piston 14, the secondary piston 15, the stepped spool 45, and the input shaft 53 are at their rear-most positions as illustrated. The first electromagnetic shut-off valve 58 is opened and the second electromagnetic shut-off valve 65 is closed as illustrated.

In this inoperative state, the valve opening rate of the control valve 54 is the maximum so that the pressurized chamber 35 is in communication with the first atmospheric pressure chamber 21 through the radial holes 84, the annular passage 83 (there is another way directly communicating with the passage 83 not through the radial holes 84), the radial holes 85, spaces between the radial holes 85 and the annular groove 48, the annular groove 48, the radial holes 49, the clearance 86 between the inner periphery of the stepped spool 45 and the outer periphery of the extension shaft 53e, the small-diameter bore 77, and the axial bore 73e. That is, in the inoperative state, the pressurized chamber 35 is connected to the reservoir 24 with the maximum valve opening rate of the control valve 54. Since the reaction chamber 38 is always in communication with the pressurized chamber 35, the reaction chamber 38 is also connected to the reservoir 24 with the maximum valve opening rate of the control valve 54 when the MCY 1 is inoperative.

The first MCY pressure chamber 28 is in communication with the first atmospheric pressure chamber 21 through the radial holes 31 of the secondary piston 15, while the second MCY pressure chamber 32 is in communication with the second atmospheric pressure chamber 25 through the radial holes 34 of the third cylindrical member 17. Therefore, in the inoperative state, the first MCY pressure chamber 28, the second MCY pressure chamber 32, the pressurized chamber 35, the reaction chamber 38, the spring chamber 46 are all at atmospheric pressure.

As the brake pedal is depressed, the input shaft 53 moves forward to advance the stepped spool 45 so as to reduce the spaces between the radial holes 85 and the annular groove 48 i.e. to reduce the valve opening rate of the control valve 54. Just like the first embodiment, according to the depression of the brake pedal, the CPU drives the pump 60, at the same time, opens the second electromagnetic shut-off valve 65 for a predetermined period so as to supply pump-discharge pressure into the pressurized chamber 35 and also supply the stored pressure of the accumulator 67 into the pressurized chamber 35. Because the valve opening rate of the control valve 54 is small, hydraulic fluid flowing through the control valve 54 is throttled, thereby developing fluid pressure in the pressurized chamber 35. During this, the rise delay of the fluid pressure in the pressurized chamber 35 due to the rise delay of the pump-discharge pressure just after the start of the pump 60 can be compensated whereby the fluid pressure of the pressurized chamber 35 rises relatively rapidly.

Because of the fluid pressure in the pressurized chamber 35, in the same manner as the first embodiment, the primary piston 14 is moved forwards, whereby MCY pressure is developed in the first MCY pressure chamber 28. Because of the MCY pressure, the secondary piston 15 is moved forwards, whereby MCY pressure is developed in the second MCY pressure chamber 32. The MCY pressure of the first and second MCY pressure chambers 28, 32 is supplied to the wheel cylinders of the two brake circuits, thereby actuating the wheel brakes.

During this, the fluid pressure in the reaction chamber 38 creates force acting on the step 78 of the stepped spool 45 in the backward direction against the input of the input shaft 53, creates force acting on the front end of the large-diameter portion 53c of the input shaft 53 against the input of the input shaft 53, and thus is controlled such that the resultant force is balanced with the input of the input shaft 53. The spring 51 is deformed by the controlled fluid pressure so that the input shaft 53 travels forwards. The input shaft 53 travels forwards in this manner, thereby exhibiting the function of the travel simulator. During this, the stepped spool 45 travels by an amount just required for changing the throttle rate of the control valve 54, but actually travels little because the fluid pressure of the reaction chamber 38 acts on the step 78 in the backward direction.

Since the fluid pressure of the reaction chamber 38 is controlled according to the input of the input shaft 53, the fluid pressure of the pressurized chamber 35 is increased according to the input of the input shaft 53 so as to develop great MCY pressure from the pedal force applied through the brake pedal with magnification.

When, although the brake pedal is depressed, no fluid pressure is developed in the pressurized chamber 35 due to a failure of the fluid pressure source, the input shaft 53 is moved largely just like the first embodiment so that the front end of the large-diameter portion 53c of the input shaft 53 comes in contact with the step 73c of the small-diameter portion 73b of the cylindrical member 73. At this point, the extension shaft 53e and the stopper ring 80 pass through the axial bore 73e. By further forward movement of the input shaft 53, the cylindrical member 73 and the input shaft 53 move together and the step 73d of the cylindrical member 73 comes in contact with the step 14a of the primary piston 14. Then, the forward movement of the input shaft 53 moves the primary piston 14 together, thereby developing MCY pressure in the first MCY pressure chamber 28 in the same manner of the first embodiment. Because of the MCY pressure, the secondary piston 15 is moved forwards, whereby MCY pressure is developed in the second MCY pressure chamber 32. The MCY pressure of the first and second MCY pressure chambers 28, 32 is supplied to the respective wheel cylinders, thereby actuating the wheel brakes. In this manner, the wheel brakes can be securely actuated by depression of the brake pedal whenever no fluid pressure is developed in the pressurized chamber 35 due to the failure of fluid pressure source.

The action and effects of the braking pressure intensifying MCY 1 of the third embodiment are otherwise the same as those of the aforementioned first or second embodiment.

Figure 6:
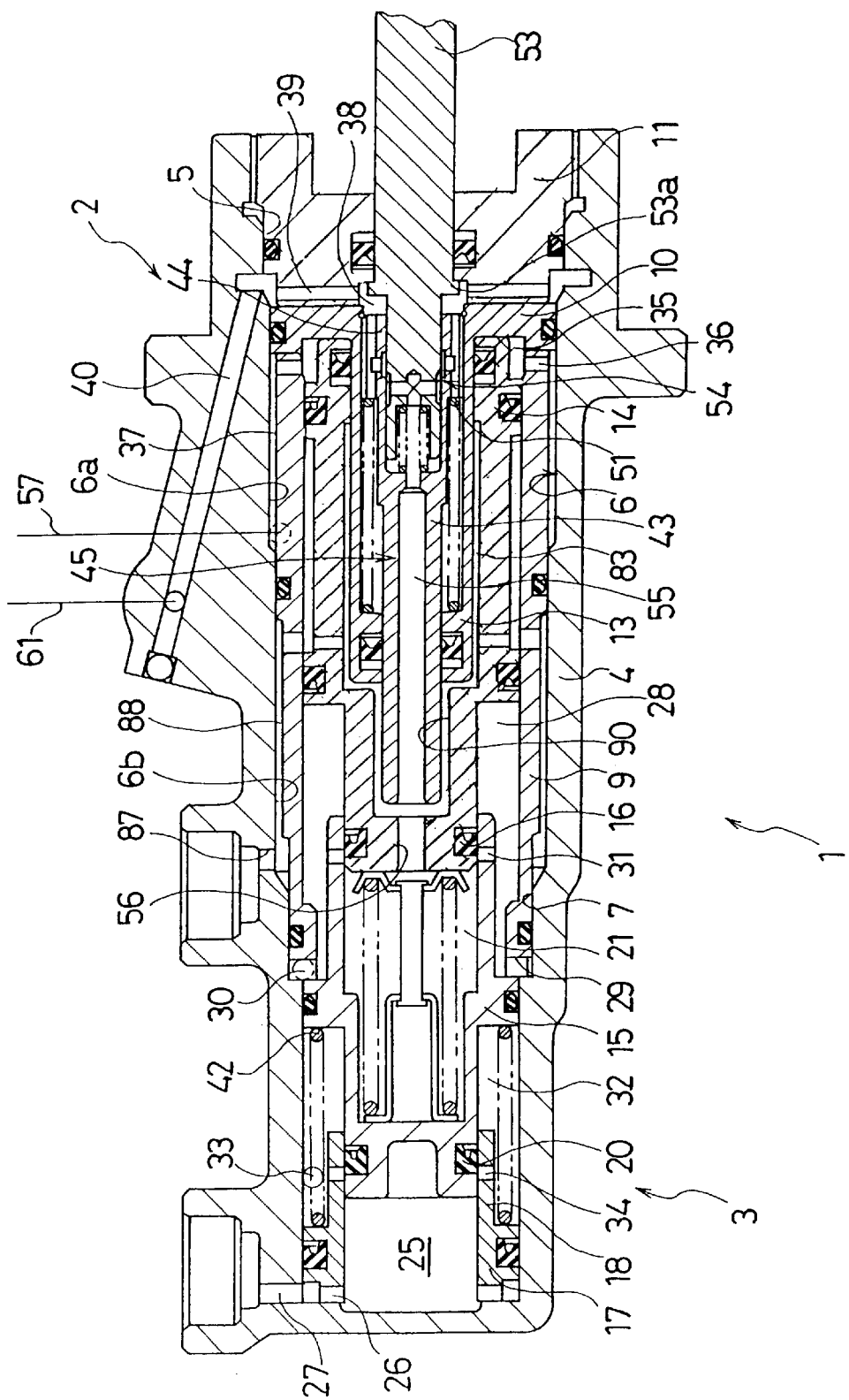
FIG. 6 is a sectional view similar to FIG. 1, but showing a braking pressure intensifying MCY according to a fourth embodiment of the present invention.
Figure 7:
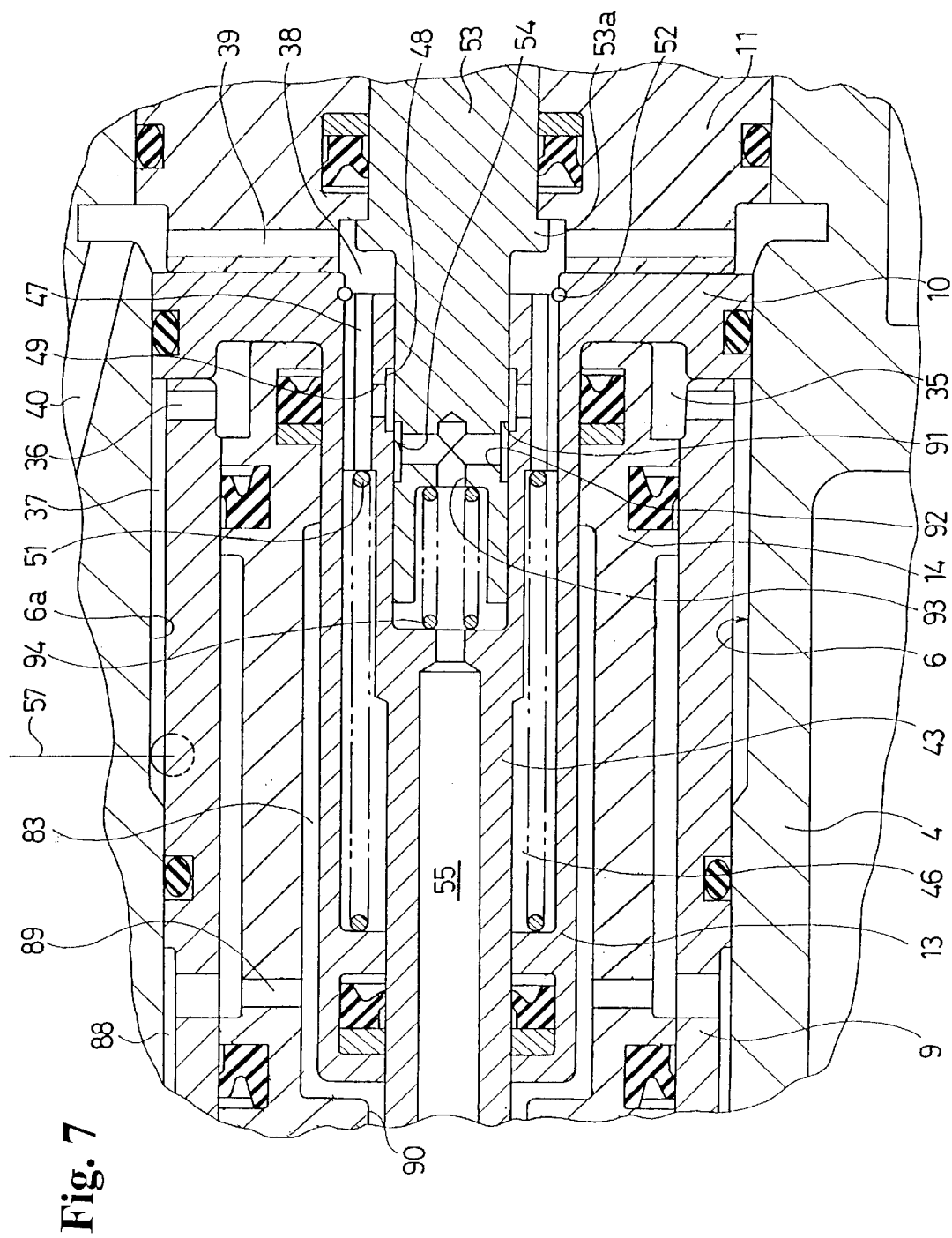
FIG. 7 is a partially enlarged sectional view similar to FIG. 2, but showing an intensification control section of the braking pressure intensifying MCY shown in FIG. 6.

FIG. 6 is a sectional view similar to FIG. 1, but showing a braking pressure intensifying MCY 1 of a fourth embodiment of the present invention, and FIG. 7 is a partially enlarged sectional view similar to FIG. 2, showing an intensification control section of the braking pressure intensifying MCY shown in FIG. 6.

As shown in FIG. 6, unlike the braking pressure intensifying MCY 1 of the first or second embodiment, the braking pressure intensifying MCY of the fourth embodiment does not have the inner cylindrical portion 19 and the axial bore 22 of the third cylindrical member 17 and the passage 23 of the housing 4. Therefore, a first atmospheric pressure chamber 21 formed in a secondary piston 15 is not connected to the reservoir 24 through the axial bore 22 and the passage 23 at the front side of the braking pressure intensifying MCY 1. That is, the return passage from the atmospheric chamber 21 does not extend to the front of the MCY 1.

In the braking pressure intensifying MCY 1 of the fourth embodiment, the return passage from the atmospheric pressure chamber 21 is formed as follows. A first cylindrical member 9 has an axial length longer than that of the first cylindrical member 9 of the first embodiment and a second bore 6 of the housing 4 is a stepped bore composed of a small-diameter portion 6a as a front half and a large-diameter portion 6b as a rear half. An annular passage 37 communicating with a pressurized chamber 35 and a line 57 is defined between the inner periphery of the large-diameter portion 6b as the rear half of the second bore 6 and the outer periphery of the first cylindrical member 9 and further an annular passage 88 always communicating with the reservoir 24 through a radial hole 87 formed in the housing 4 is defined between the inner periphery of the small-diameter portion 6a as the front half of the second bore 6 and the outer periphery of the first cylindrical member 9. The two annular passages 37 and 88 are fluid-tightly isolated from each other.

The annular passage 88 is always in communication with an annular passage 83 formed between the outer periphery of the small-diameter portion 73b of the cylindrical member 73 and the inner periphery of the primary piston 14. The annular passage 83 is always in communication with the first atmospheric pressure chamber 21 through a bore 90 of the primary piston 14 and an axial bore 56 of the primary piston 14.

In the braking pressure intensifying MCY 1 of the fourth embodiment, an annular groove 91, radial holes 92 communicating with the annular groove 91, and an axial hole 93 communicating with the radial holes 92 and also with an axial bore 55 of the stepped spool 45 are formed in a front end portion of the input shaft 53. The annular groove 48 of the stepped spool 45 and the annular groove 91 of the input shaft 53 cooperate to compose a control valve 54. In the inoperative state, the space between the annular groove 48 of the stepped spool 45 and the annular groove 53 of the input shaft 53 is the maximum, that is, the valve opening rate of the control valve 54 is the maximum. As the input shaft 53 travels forwards, the space between the annular groove 48 and the annular groove 91 i.e. the valve opening rate of the control valve 54 is reduced.

A spring 94 is disposed in a compressed state between the stepped spool 45 and the input shaft 53 so that the input shaft 53 is always biased in the backward direction by the spring force of the spring 94.

The construction of the braking pressure intensifying MCY 1 of the fourth embodiment is otherwise the same as that of the first or second embodiment.

According to the braking pressure intensifying MCY 1 of the fourth embodiment, the inner cylindrical portion 19 of the third cylindrical member 17 does not exist, so there is no sliding between the inner cylindrical portion 19 and the secondary piston 15, thereby reducing the number of sliding portions of the secondary piston 15. The accuracy required for ensuring coaxial relation to sliding portions of the component parts can be loosened by such reduction in the number of sliding portions, thereby improving the workability and assembly of the braking pressure intensifying MCY 1.

The action and effects of the braking pressure intensifying MCY 1 of the fourth embodiment are otherwise the same as those of the first or second embodiment.

In the braking pressure intensifying MCY 1 of the fourth embodiment, an electromagnetic selector valve 62 as employed in the first embodiment is used. Instead of the electromagnetic selector valve 62, third and fourth electromagnetic shut-off valves 68, 70 as employed in the second embodiment shown in FIG. 3 may be employed.

Figure 8:
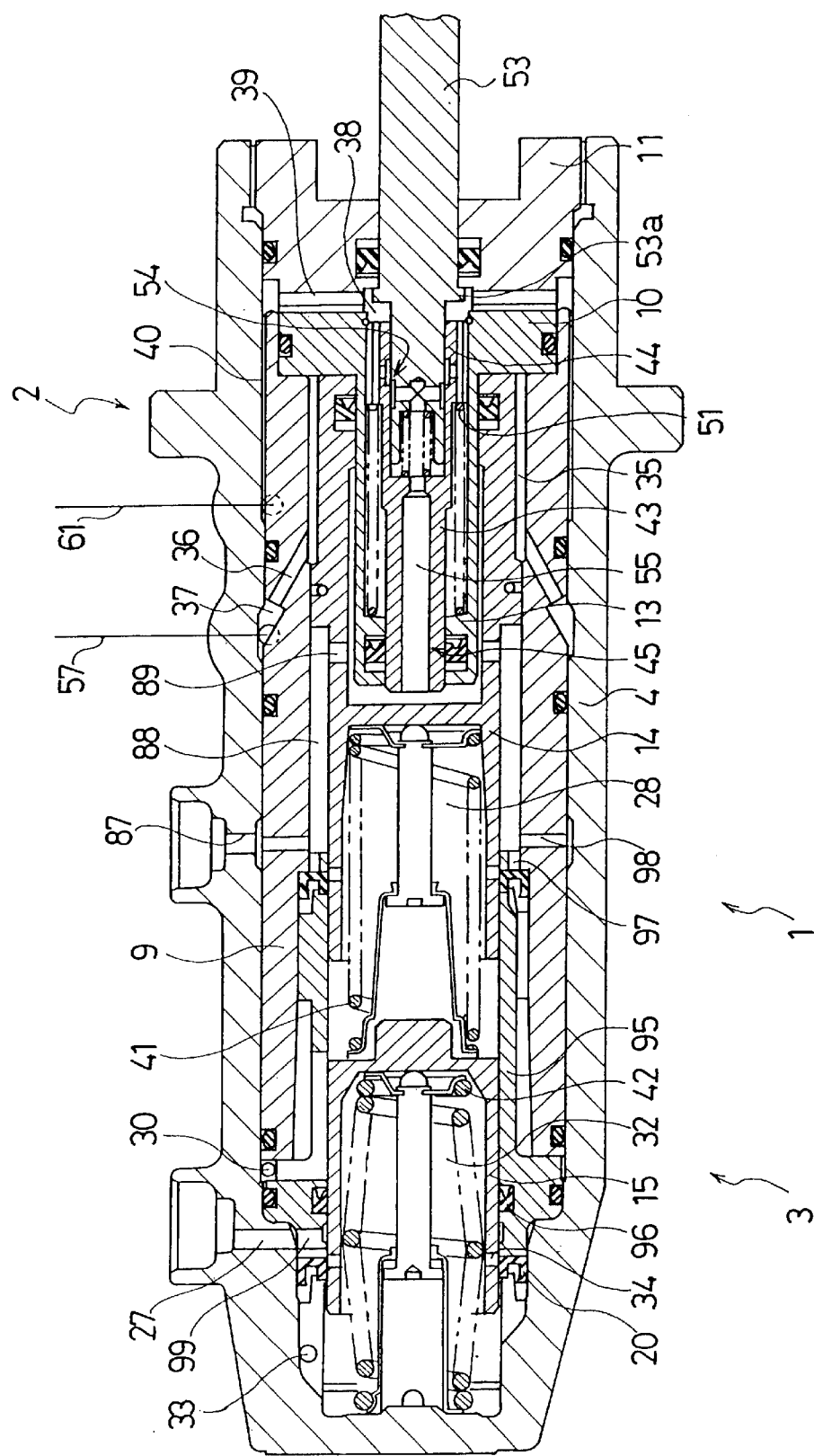
FIG. 8 is a sectional view similar to FIG. 1, but showing a braking pressure intensifying MCY according to a fifth embodiment of the present invention.
Figure 9:
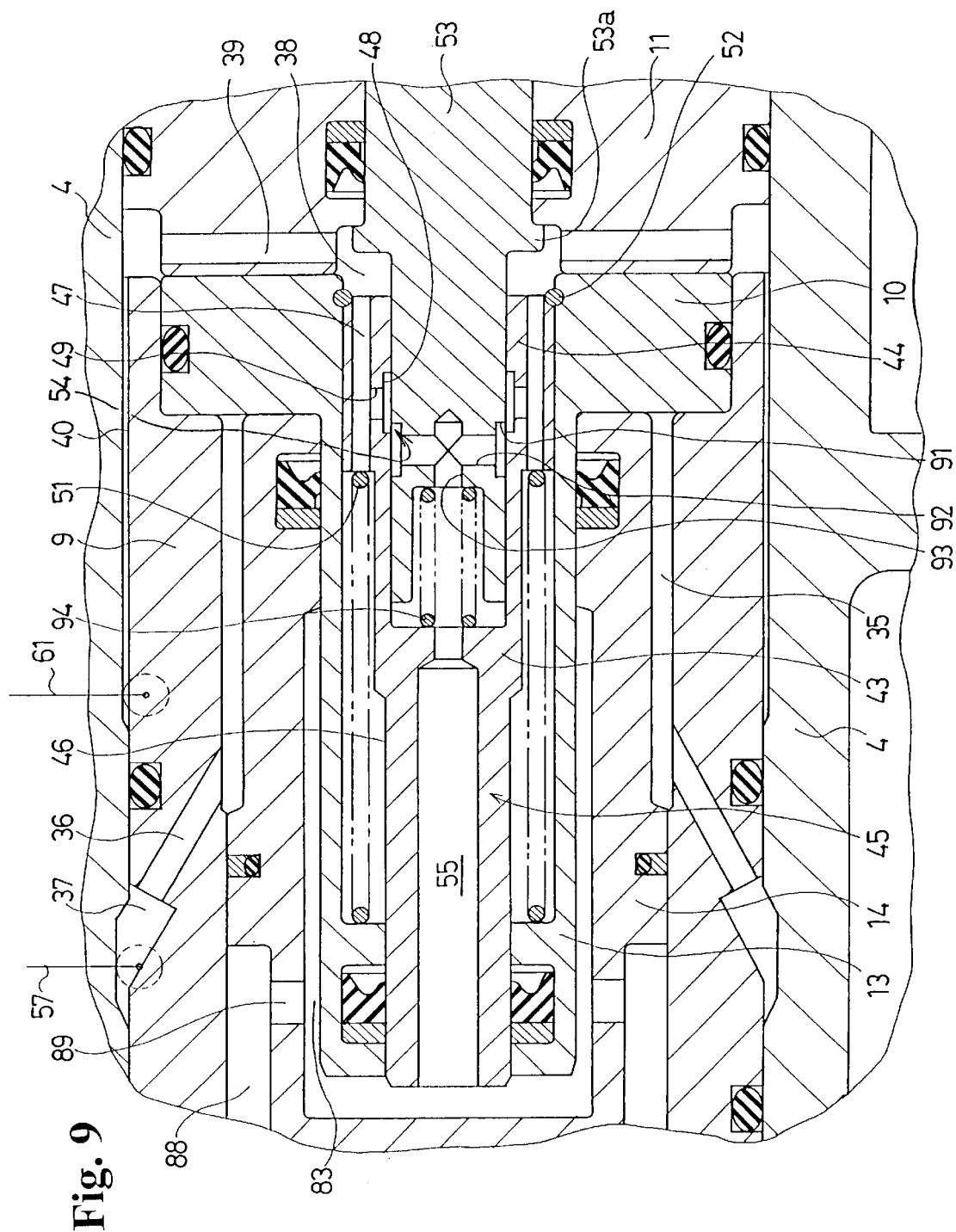
FIG. 9 is a partially enlarged sectional view similar to FIG. 2, but showing an intensification control section of the braking pressure intensifying MCY shown in FIG. 8.

FIG. 8 is a sectional view similar to FIG. 1, but showing a braking pressure intensifying MCY 1 of a fifth embodiment of the present invention, and FIG. 9 is a partially enlarged sectional view similar to FIG. 2, showing an intensification control section of the braking pressure intensifying MCY shown in FIG. 8.

As shown in FIG. 8 and FIG. 9, unlike the fourth embodiment shown in FIG. 6, the passage 40 allowing the communication between the reaction chamber 38 and the passage 61 is not provided in a housing 4 of the braking pressure intensifying MCY of the fifth embodiment. Instead of this, an annular passage is formed between the outer periphery of a rear end portion of a first cylindrical member 9 and the inner periphery of the housing 4. The passage 40 is in a fluid-tight relation to an annular passage 37 which is also formed between the outer periphery of a rear end portion of the first cylindrical member 9 and the inner periphery of the housing 4.

The annular passage 88 communicating with a reservoir 24 is not formed between the outer periphery of the rear end portion of the first cylindrical member 9 and the inner periphery of the housing 4. Instead of this, the annular passage 88 is formed between the inner periphery of the first cylindrical member 9 and the outer periphery of the primary piston 14. In addition, the primary piston 14 does not have the axial bore 56.

On the other hand, the MCY pressure producing section 3 of the fifth embodiment has a sleeve 95 inside the housing 4. A front end portion of the primary piston 14 is arranged within a rear end portion of the sleeve 95 such that the front end portion of the primary piston 14 is fluid-tightly and slidably fitted in a first cup seal 16 disposed between the first cylindrical member 9 and the sleeve 95.

A secondary piston 15 is arranged in an axial bore of the sleeve 95 and an axial bore of the housing 4. The secondary piston 15 is fluid-tightly and slidably arranged by a cup seal 96 disposed on the inner periphery of the axial bore of the sleeve 95 and a second cup seal 20 disposed on the housing 4 between the housing 4 and the sleeve 95.

A first MCY pressure chamber 28 is formed between the primary piston 14 and the secondary piston 15 and a second MCY pressure chamber 32 is formed between the housing 4 and the secondary piston 15.

The primary piston 14 has radial holes 31 formed therein. Therefore, though the first cup seal 16 is movable and the radial holes 31 are stationary in any of the aforementioned embodiments, radial holes 31 are movable and the first cup seal 16 is stationary in the fifth embodiment. The radial holes 31 are positioned slightly behind the first cup seal 16 when the primary piston 14 is in the inoperative state as illustrated, where the first MCY pressure chamber 28 is in communication with the reservoir 24 through the radial holes 31, a clearance behind the first cup seal 16, an axial holes 97 formed in the first cylindrical member 9, the passage 88, radial holes 98 formed in the first cylindrical member 9, and a radial hole 87. In this state, therefore no MCY pressure is developed in the first MCY pressure chamber 28. When the radial holes 31 are positioned ahead of the first cup seal 16 because of forward movement of the primary piston 14, the flow of fluid from the first MCY pressure chamber 28 toward the reservoir 24 is isolated, thereby developing MCY pressure in the first MCY pressure chamber 28.

The secondary piston 15 has radial holes 34 formed therein. Therefore, though the second cup seal 20 is movable and the radial holes 34 are stationary in any of the aforementioned embodiments, radial holes 34 are movable and the second cup seal 20 is stationary in the fifth embodiment. The radial holes 34 are positioned slightly behind the second cup seal 20 when the secondary piston 15 is in the inoperative state as illustrated, where the second MCY pressure chamber 32 is in communication with the reservoir 24 through the radial holes 34, a clearance between the outer periphery of the secondary piston 15 and the inner periphery of the sleeve 95, a radial hole 99 formed in the sleeve 95, and a radial hole 27 of the housing 4. In this state, therefore no MCY pressure is developed in the second MCY pressure chamber 32. When the radial holes 34 is positioned ahead of the second cup seal 20 because of forward movement of the secondary piston 15, the flow of fluid from the second MCY pressure chamber 32 toward the reservoir 24 is isolated, thereby developing MCY pressure in the second MCY pressure chamber 32.

The construction of the braking pressure intensifying MCY 1 of the fifth embodiment is otherwise the same as that of the fourth embodiment shown in FIG. 6.

In the braking pressure intensifying MCY 1 of any of the first through fourth embodiments, the first and second MCY pressure chambers 28, 32 in the MCY pressure producing section 3 are located outside the primary piston 14 and the secondary piston 15 and the first and second atmospheric pressure chambers 21, 25 are located at the centers of the primary piston 14 and the secondary piston 15. In the braking pressure intensifying MCY of the fifth embodiment, however, the first and second MCY pressure chambers 28, 32 are located at the centers of the primary piston 14 and the secondary piston 15 and the first and second atmospheric pressure chambers 21, 25 substantially do not exist, thereby allowing compact design.

The action and effects of the braking pressure intensifying MCY 1 of the fifth embodiment are otherwise the same as those of the fourth embodiment.

Figure 10:
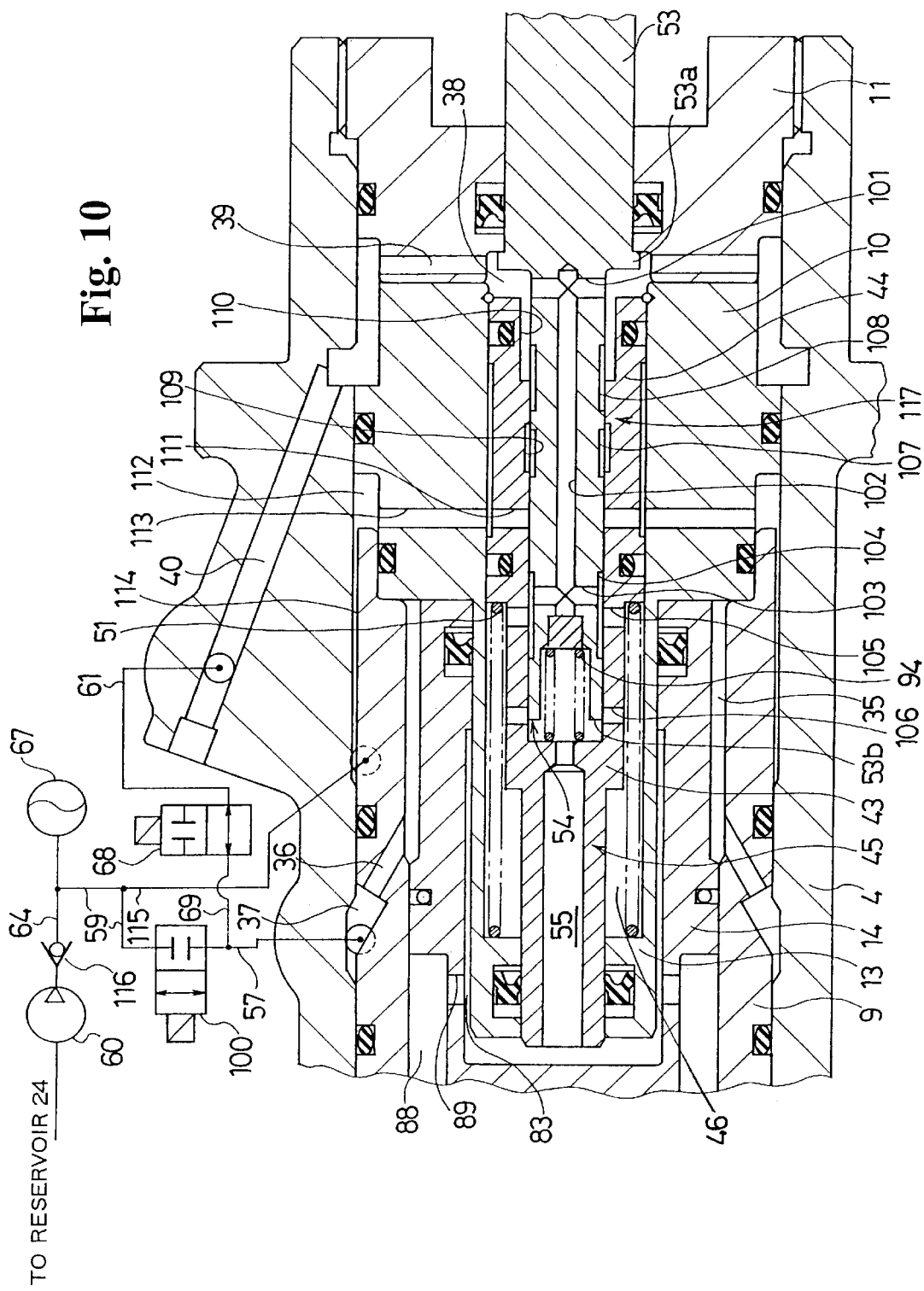
FIG. 10 is a sectional view similar to FIG. 9, but showing a braking pressure intensifying MCY according to a sixth embodiment of the present invention.

FIG. 10 is a sectional view similar to FIG. 9 showing a braking pressure intensifying MCY of a sixth embodiment according to the present invention.

The braking pressure intensifying MCY 1 of any of the first through fifth embodiments is of open-center type in which the pressurized chamber 35 is in communication with the discharge side of the pump 60 and with the reservoir 24 in the inoperative state. The braking pressure intensifying MCY of the sixth embodiment is however of closed-center type in which the pressurized chamber 35 is in communication with the reservoir 24 and is isolated from the discharge side of the pump 60 in the inoperative state.

As will be described in detail, the braking pressure intensifying MCY 1 of the sixth embodiment is different from the braking pressure intensifying MCY 1 of the fifth embodiment by some of component parts corresponding to the intensification control section 2 circled by a curved line shown in FIG. 8, and some of components parts corresponding to the fluid pressure supply circuit including the pump 60, the accumulator 67, the electromagnetic shut-off valves 58, 65, 68, 70, and the lines 57, 59, 61, 64, 66, 69, 71, 72, but is the same as the braking pressure intensifying MCY 1 by component parts corresponding to the master cylinder pressure producing section 3 and the reservoir 24.

As shown in FIG. 10, instead of the first electromagnetic shut-off valve 58 of the fifth embodiment which is disposed between the line 57 and the line 59, the braking pressure intensifying MCY 1 of the sixth embodiment has a normally-open electromagnetic shut-off valve 100 (corresponding to the first electromagnetic shut-off valve of the present invention) disposed between the line 57 and the line 59, and does not have the second electromagnetic shut-off valve 65 employed in the fifth embodiment which is disposed between the line 64 and the line 66. In this embodiment, the line 69 connected to the third electromagnetic shut-off valve 68 is not connected to the line 59 and is connected to the line 57. Instead of the axial holes 47 which always allow the communication between the reaction chamber 38 and the spring chamber 46, the annular groove 48, and the radial holes 49 of the fifth embodiment, the braking pressure intensifying MCY 1 of this embodiment has, as passage always allowing the communication between the reaction chamber 38 and the spring chamber 46, radial holes 101 formed in a front end portion of the input shaft 53 which are always in communication with the reaction chamber 38, an axial bore 102 which is in communication with the radial holes 101, radial holes 103 which are in communication with the axial bore 102, an annular groove 104 which is in communication with the radial holes 103, and radial holes 105 formed in the stepped spool 45 which always allow the communication between the spring chamber 46 and the annular groove 104.

In this embodiment, the input shaft 53 does not have the annular groove 91, the radial holes 92, and the axial hole 93 which are formed in the front end portion thereof to compose the control valve 54 of the fifth embodiment. Instead of this, the stepped spool 45 has, as a component of the control valve 54, radial holes 106 for allowing the communication between the spring chamber 46 and the axial bore 55 of the stepped spool 45. The stepped spool 45 and a front end 53b of the input shaft 53 cooperate to compose the control valve 54 which is a normally-open valve similar to that of any of the aforementioned embodiments.

Formed in the outer periphery of a front end portion of the input shaft 53 are an annular groove 107 and an annular groove 108. Formed in the inner periphery of the stepped spool 45 are an annular groove 109 which is always in communication with the annular groove 107 and an annular groove 110 which is always in communication with the reaction chamber 38 and the annular groove 108. Further, the stepped spool 45 has radial holes 110 formed therein for always allowing the communication between its inner periphery and its outer periphery. In the inoperative state as illustrated, the annular groove 107 is isolated from the radial holes 111 and the annular groove 108 is isolated from the annular groove 109. In the operative state i.e. when the input shaft 53 travels forward, the annular groove 107 communicates with the radial holes 111 and the annular groove 108 communicates with the annular groove 109, thereby allowing the communication between the reaction chamber 38 and the radial holes 111.

The second cylindrical member 10 has radial holes 113 formed therein for always allowing the communication between a space 112, defined between the outer periphery of the second cylindrical member 10 and the inner periphery of the second bore 6 of the housing 4, and the radial holes 111. An annular passage 114 is formed between the outer periphery of the first cylindrical member 9 and the inner periphery of the second bore 6 of the housing 4. The passage 114 is always in communication with the line 59 through a line 115. That is, the radial holes 111 of the stepped spool 45 are always in communication with the discharge side of the pump 60 and the accumulator 67. The accumulator 67 of the sixth embodiment has pressure storing capacity which is larger than that of the accumulator 67 of any of the first through fifth embodiments. The setting pressure of the accumulator 67 is a value sufficient for actuating service braking. On the line 64 at the discharge side of the pump, a check valve 116 is provided which allows only the flow of hydraulic fluid from the discharge side of the pump 60 toward the line 59 and the accumulator 67.

The stored pressure of the accumulator 67 is always introduced to the radial holes 111 of the stepped spool 45. When operated, the communication between the reaction chamber 38 and the radial holes 111 is allowed, whereby the stored pressure of the accumulator 67 is introduced to the reaction chamber 38 and the pressurized chamber 35 just like the aforementioned embodiments. In this manner, the annular groove 107, the annular groove 108, the annular groove 109, the annular groove 110, and the radial holes 111 cooperate to compose a supply valve 117 for supplying the stored pressure of the accumulator 67 to the reaction chamber 38.

The construction of the braking pressure intensifying MCY 1 of the sixth embodiment is otherwise the same as that of the fifth embodiment shown in FIG. 8.

Hereinafter, the action of the braking pressure intensifying MCY 1 of the sixth embodiment having the aforementioned construction will be described.

As the stored pressure of the accumulator 67 is lowered to the setting pressure, the pump 60 is driven to supply the pump-discharge pressure to the accumulator 67, whereby fluid pressure at the setting pressure is normally stored in the accumulator 67.

In the inoperative state as illustrated, the annular groove 107 is isolated from the radial holes 111 and the annular groove 108 is isolated from the annular groove 109 so that the supply valve 117 is closed, the fifth electromagnetic shut-off valve 100 is closed, and the third electromagnetic valve 68 is opened.

Therefore, the stored pressure of the accumulator 67 is introduced into the radial holes 111 of the stepped spool 45, while the stored pressure of the accumulator 67 is not introduced into the pressurized chamber 35 and the reaction chamber 38. The pressurized chamber 35 and the reaction chamber 38 are both at the atmospheric pressure because they are in communication with the reservoir 24.

In a braking maneuver, the input shaft 53 travels forwards so that the supply valve 117 is opened to allow the communication between the radial holes 111 and the reaction chamber 38 as mentioned above. In addition, the radial holes 106 are narrowed by the front end 53b of the input shaft 53 so that the valve opening rate of the control valve 54 is reduced. Therefore, the hydraulic fluid at the stored pressure of the accumulator 67 introduced in the radial holes 111 is supplied to the reaction chamber 38 through the supply valve 117 and also is supplied to the pressurized chamber 35 through the radial holes 39, the passage 40, the line 61, the third electromagnetic shut-off valve 69, the line 69, the line 57, the passage 37, and the passage 36. At the same time, the hydraulic fluid supplied to the reaction chamber 38 flows into the spring chamber 46 through the radial holes 101, the axial bore 102, the radial holes 103, the annular groove 104, and the radial holes 105 and then flows through the control valve 54 from the spring chamber 46. Since, during this, the hydraulic fluid is throttled by the control valve 54, the fluid pressure of the spring chamber 46 is controlled according to the input of the input shaft 53 so that the fluid pressure in the reaction chamber 38 and the pressurized chamber 35 is also controlled to be the same as that of the spring chamber 46. By the fluid pressure supplied to the pressurized chamber 35, the primary piston 14 is operated in the same manner as the fifth embodiment so that the master cylinder pressure producing section produces master cylinder pressure, thereby actuating wheel brakes.

The fluid pressure of the reaction chamber 38 is controlled such that reaction force applied to the input shaft 53 by the fluid pressure is balanced against the input of the input shaft 53. That is, the fluid pressure of the reaction chamber 38 is controlled according to the input of the input shaft 53. On the other hand, as fluid pressure is developed in the reaction chamber 38 and the spring chamber 46, the stepped spool 45 is pressed to travel forwards against the spring force of the spring 51 by the action of this fluid pressure because of differential between the pressure receiving area of the large-diameter portion 44 at the reaction chamber 38 side and the pressure receiving area of the large-diameter portion 44 at the spring chamber 46 side. The stepped spool 45 travels forward in such a manner that the force acting on the stepped spool 45 by the fluid pressure and the spring force of the spring 51 are balanced. Accordingly, the input shaft 53 also travels forwards. That is, the input shaft 53 travels forwards regardless of the forward travel of the primary piston 14. This means that the input side and the output side of the braking pressure intensifying MCY can be separately operated and the function as the travel simulator can be exhibited. By the function as the travel simulator, the travel of the input shaft 53 can be secured even when the input side and the output side of the braking pressure intensifying MCY are separated.

When the braking maneuver is cancelled, the supply valve 117 is closed and the control valve 54 is opened so that the spring chamber 46 is in communication with the reservoir 24. Since the reaction chamber 38 and the pressurized chamber 35 are always in communication with the spring chamber 46, the fluid pressures of the reaction chamber 38 and the pressurized chamber 35 are discharged to the reservoir 24, whereby the both chambers 35, 38 are at the atmospheric pressure, thereby canceling the braking. Accordingly, the braking pressure intensifying MCY 1 becomes in the inoperative state as illustrated.

During the automatic braking, the third electromagnetic shut-off valve 68 is closed and the fifth electromagnetic shut-off valve 100 is opened, whereby the stored pressure of the accumulator 67 is introduced into the pressurized chamber 35. Then, the primary piston 14 is operated so as to develop master cylinder pressure in the same manner as mentioned above, thereby automatically actuating the wheel brakes.

The action and effects of the braking pressure intensifying MCY 1 of the sixth embodiment are otherwise the same as those of the fifth embodiment. Also in the braking pressure intensifying MCY 1 of the sixth embodiment, the control valve 54 may be composed of the spool 45 and a member of the housing 4.

As apparent from the above description, according to the braking pressure intensifying master cylinder of the present invention, the pressure intensifying function is contained in the master cylinder itself, thus eliminating the need for a booster such as a vacuum booster or a hydraulic booster as conventionally used. Therefore, the entire length of the braking pressure intensifying master cylinder can be shorter than the conventional one. This also enables to facilitate the structure of the brake system and improve the flexibility for installation of the braking pressure intensifying master cylinder.

According to the present invention, the function of travel simulator can be contained in the braking pressure intensifying master cylinder. By changing the pressure receiving area of the control valve on which fluid pressure regulated by the control valve acts and/or changing the biasing force of the biasing means, the travel characteristic of the input shaft as the input side can be freely changed independently from the output side, without influence on the master cylinder pressure as the output side of the braking pressure intensifying master cylinder.

Because the travel characteristic of the input shaft is not influenced by the master cylinder pressure, the operational feel is improved.

The travel simulator is built in the braking pressure intensifying master cylinder, that is, no external simulator is necessary, thereby allowing compact design of the braking pressure intensifying MCY According to the present invention, the pressurized chamber and the reaction chamber can be isolated from each other, whereby fluid pressure of the fluid pressure source can be supplied to the pressurized chamber independently from the reaction chamber. This facilitates the regenerative brake coordination control, the automatic brake control, the auto cruise compensation control, and/or the brake assist control.

According to the present invention, the fluid pressure of the reaction chamber should be lower than the fluid pressure of the pressurized chamber by an amount corresponding to the relief pressure of the relief valve, whereby the braking pressure intensifying master cylinder can exhibit jumping characteristic. According to the invention, the second electromagnetic shut-off valve is controlled, whereby the braking pressure intensifying master cylinder can exhibit jumping characteristic.

According to the present invention, the master cylinder piston can be directly operated by the input of the input shaft when no fluid pressure is developed in the pressurized chamber due to the failure of fluid pressure source. Therefore, the wheel brakes can be securely actuated whenever no fluid pressure is developed in the pressurized chamber due to the failure of fluid pressure source.

What we claim is:

1. A braking pressure intensifying master cylinder comprising:

a housing;

an input shaft penetrating through the housing and traveling by input applied in braking maneuver;

a control valve controlled by said input shaft to regulate a fluid pressure of a fluid pressure source to develop a fluid pressure corresponding to said input;

a pressurized chamber connected to the control valve for receiving the fluid pressure regulated by said control valve;

a master cylinder piston which is actuated by the fluid pressure supplied into the pressurized chamber to develop a master cylinder pressure;

biasing means operationally connected to the control valve for biasing the control valve in a direction opposite to an operational direction of the input shaft; and means situated in the housing and integrally formed with the control valve, said means traveling relative to the housing such that a force produced by the fluid pressure regulated by said control valve and the biasing force of said biasing means are balanced;

wherein said input shaft travels according to a travel of the means travelling relative to the housing, and said control valve is biased by a force of the biasing means in the direction opposite to the operational direction of the input shaft and is urged by the fluid pressure regulated by the control valve in the operational direction of the input shaft.

2. A braking pressure intensifying master cylinder as claimed in claim 1, further comprising a reaction chamber which communicates with said pressurized chamber and into which the fluid pressure regulated by said control valve is supplied, wherein the fluid pressure supplied in said reaction chamber forces said input shaft against said input.

3. A braking pressure intensifying master cylinder as claimed in claim 2, wherein said control valve has a valve spool which is slidably disposed to develop said regulated fluid pressure, and said valve spool is biased by an operational force produced by the fluid pressure regulated by said control valve and by the biasing force of said biasing means in directions opposite to each other.

4. A braking pressure intensifying master cylinder as claimed in claim 3, wherein said control valve is formed by said valve spool and said input shaft, said valve spool travels such that said biasing force and said operational force are balanced, and said input shaft travels depending on the travel of said valve spool.

5. A braking pressure intensifying master cylinder as claimed in claim 3, wherein said control valve comprises said valve spool and the housing, and said input shaft travels such that said biasing force which biases said valve spool and said operational force are balanced.

6. A braking pressure intensifying master cylinder as claimed in claim 4 or 5, further comprising an electromagnetic shut-off valve for controlling communication/isolation between said fluid pressure source and said pressurized chamber, and a controller for controlling opening/closing of said electromagnetic shut-off valve.

7. A braking pressure intensifying master cylinder as claimed in claim 1, wherein said master cylinder piston is pressed by said input shaft to develop the master cylinder pressure when no fluid pressure is developed in said pressurized chamber due to failure of said fluid pressure source even with travel of said input shaft in the braking maneuver.

8. A brake pressure intensifying master cylinder as claimed in claim 1, wherein sad means attached to the housing is a stepped spool.

9. A braking pressure intensifying master cylinder as claimed in claim 1, wherein said housing includes a cylindrical member immovably fixed thereto, said means being slidably provided in the cylindrical member.

10. A braking pressure intensifying master cylinder comprising:
a housing;
an input shaft penetrating through the housing and traveling by input applied in braking maneuver;
a control valve controlled by said input shaft to regulate a fluid pressure of a fluid pressure source to develop a fluid pressure corresponding to said input, said control valve having a valve spool which is slidably disposed to develop said regulated fluid pressure and being formed by the valve spool and input shaft;
a pressurized chamber connected to the control valve for receiving the fluid pressure regulated by said control valve;
a master cylinder piston which is actuated by the fluid pressure supplied into the pressurized chamber to develop a master cylinder pressure;
biasing means operationally connected to the control valve for biasing the control valve in a direction opposite to an operational direction of the input shaft such that said valve spool is biased by an operational force produced by the fluid pressure regulated by said control valve and by the biasing force of said biasing means in directions opposite to each other;
means situated in the housing and integrally formed with the control valve, said means traveling relative to the housing such that a force produced by the fluid pressure regulated by said control valve and the biasing force of said biasing means are balanced;
a reaction chamber which communicates with said pressurized chamber and into which the fluid pressure regulated by said control valve is supplied, the fluid pressure supplied in said reaction chamber forcing said input shaft against said input;
an electromagnetic shut-off valve for controlling communication/isolation between said fluid pressure source and said pressurized chamber;
an electromagnetic selector valve to be selectively controlled for allowing communication between said pressurized chamber and said reaction chamber or restricting communication therebetween by a relieve valve; and
a controller for controlling opening/closing of said electromagnetic shut-off valve and selection of said electromagnetic selector valve;
wherein said input shaft travels depending on the travel of said valve spool and according to a travel of the means travelling relative to the housing; said control valve is biased by a force of the biasing means in the direction opposite to the operational direction of the input shaft and is urged by the fluid pressure regulated by the control valve in the operational direction of the input shaft; and said valve spool travels such that said biasing force and said operational force are balanced.

11. A braking pressure intensifying master cylinder comprising:
a housing;
an input shaft penetrating through the housing and traveling by input applied in braking maneuver;
a control valve controlled by said input shaft to regulate a fluid pressure of a fluid pressure source to develop a fluid pressure corresponding to said input, said control valve having a valve spool which is slidably disposed to develop said regulated fluid pressure and being formed of the valve spool and the housing;
a pressurized chamber connected to the control valve for receiving the fluid pressure regulated by said control valve;
a master cylinder piston which is actuated by the fluid pressure supplied into the pressurized chamber to develop a master cylinder pressure;
biasing means operationally connected to the control valve for biasing the control valve in a direction opposite to an operational direction of the input shaft such that said valve spool is biased by an operational force produced by the fluid pressure regulated by said control valve and by the biasing force of said biasing means in directions opposite to each other;
means situated in the housing and integrally formed with the control valve, said means traveling relative to the housing such that a force produced by the fluid pressure regulated by said control valve and the biasing force of said biasing means are balanced;
a reaction chamber which communicates with said pressurized chamber and into which the fluid pressure regulated by said control valve is supplied, the fluid pressure supplied in said reaction chamber forcing said input shaft against said input;
an electromagnetic shut-off valve for controlling communication/isolation between said fluid pressure source and said pressurized chamber;
an electromagnetic selector valve to be selectively controlled for allowing communication between said pressurized chamber and said reaction chamber or restricting communication therebetween by a relieve valve; and a controller for controlling opening/closing of said electromagnetic shut-off valve and selection of said electromagnetic selector valve;

wherein said input shaft travels according to a travel of the means travelling relative to the housing such that said biasing force which biases said valve spool and said operational force are balanced; and said control valve is biased by a force of the biasing means in the direction opposite to the operational direction of the input shaft and is urged by the fluid pressure regulated by the control valve in the operational direction of the input shaft.

12. A braking pressure intensifying master cylinder comprising:

a housing;

an input shaft penetrating through the housing and traveling by input applied in braking maneuver;

a control valve controlled by said input shaft to regulate a fluid pressure of a fluid pressure source to develop a fluid pressure corresponding to said input, said control valve having a valve spool which is slidably disposed to develop said regulated fluid pressure and being formed by the valve spool and input shaft;

a pressurized chamber connected to the control valve for receiving the fluid pressure regulated by said control valve;

a master cylinder piston which is actuated by the fluid pressure supplied into the pressurized chamber to develop a master cylinder pressure;

biasing means operationally connected to the control valve for biasing the control valve in a direction opposite to an operational direction of the input shaft such that said valve spool is biased by an operational force produced by the fluid pressure regulated by said control valve and by the biasing force of said biasing means in directions opposite to each other;

means situated in the housing and integrally formed with the control valve, said means traveling relative to the housing such that a force produced by the fluid pressure regulated by said control valve and the biasing force of said biasing means are balanced;

a reaction chamber which communicates with said pressurized chamber and into which the fluid pressure regulated by said control valve is supplied, the fluid pressure supplied in said reaction chamber forcing said input shaft against said input;

a first electromagnetic shut-off valve for controlling communication/isolation between said fluid pressure source and said pressurized chamber;

a second electromagnetic shut-off valve for controlling the communication/isolation between said fluid pressure source and said reaction chamber; and a controller for controlling opening/closing of said first and second electromagnetic shut-off valves;

wherein said input shaft travels depending on the travel of said valve spool and according to a travel of the means travelling relative to the housing; said control valve is biased by a force of the biasing means in the direction opposite to the operational direction of the input shaft and is urged by the fluid pressure regulated by the control valve in the operational direction of the input shaft; and said valve spool travels such that said biasing force and said operational force are balanced.

13. A braking pressure intensifying master cylinder as claimed in claim 12, wherein said fluid pressure source comprises a pump which is actuated when necessary to discharge hydraulic fluid, and an accumulator in which pressure exceeding a setting value is stored by said pump; said first electromagnetic shut-off valve controls communication/isolation between said pump and said pressurized chamber, and said second electromagnetic shut-off valve controls communication/isolation between said pump and said reaction chamber; and communication/isolation between said accumulator and said pressurized chamber is controlled by a third electromagnetic shut-off valve, opening/closing of which is controlled by said controller.

14. A braking pressure intensifying master cylinder comprising:

a housing;

an input shaft penetrating through the housing and traveling by input applied in braking maneuver;

a control valve controlled by said input shaft to regulate a fluid pressure of a fluid pressure source to develop a fluid pressure corresponding to said input, said control valve having a valve spool which is slidably disposed to develop said regulated fluid pressure and being formed of the valve spool and the housing;

a pressurized chamber connected to the control valve for receiving the fluid pressure regulated by said control valve;

a master cylinder piston which is actuated by the fluid pressure supplied into the pressurized chamber to develop a master cylinder pressure;

biasing means operationally connected to the control valve for biasing the control valve in a direction opposite to an operational direction of the input shaft such that said valve spool is biased by an operational force produced by the fluid pressure regulated by said control valve and by the biasing force of said biasing means in directions opposite to each other;

means situated in the housing and integrally formed with the control valve, said means traveling relative to the housing such that a force produced by the fluid pressure regulated by said control valve and the biasing force of said biasing means are balanced;

a reaction chamber which communicates with said pressurized chamber and into which the fluid pressure regulated by said control valve is supplied, the fluid pressure supplied in said reaction chamber forcing said input shaft against said input;

a first electromagnetic shut-off valve for controlling communication/isolation between said fluid pressure source and said pressurized chamber;

a second electromagnetic shut-off valve for controlling the communication/isolation between said fluid pressure source and said reaction chamber; and a controller for controlling opening/closing of said first and second electromagnetic shut-off valves;

wherein said input shaft travels according to a travel of the means travelling relative to the housing such that said biasing force which biases said valve spool and said operational force are balanced; and said control valve is biased by a force of the biasing means in the direction opposite to the operational direction of the input shaft and is urged by the fluid pressure regulated by the control valve in the operational direction of the input shaft.

15. A braking pressure intensifying master cylinder as claimed in claim 14, wherein said fluid pressure source comprises a pump which is actuated when necessary to discharge hydraulic fluid, and an accumulator in which pressure exceeding a setting value is stored by said pump; said first electromagnetic shut-off valve controls communication/isolation between said pump and said pressurized chamber, and said second electromagnetic shut-off valve controls communication/isolation between said pump and said reaction chamber; and communication/isolation between said accumulator and said pressurized chamber is controlled by a third electromagnetic shut-off valve, opening/closing of which is controlled by said controller.

16. A braking pressure intensifying master cylinder comprising:

a housing;

an input shaft penetrating through the housing and traveling by input applied in braking maneuver;

a control valve controlled by said input shaft to regulate a fluid pressure of a fluid pressure source to develop a fluid pressure corresponding to said input, said fluid pressure source having at least an accumulator in which pressure exceeding a setting value is stored, said control valve having a valve spool which is slidably disposed to develop said regulated fluid pressure and being formed by the valve spool and input shaft;

a pressurized chamber connected to the control valve for receiving the fluid pressure regulated by said control valve;

a master cylinder piston which is actuated by the fluid pressure supplied into the pressurized chamber to develop a master cylinder pressure;

biasing means operationally connected to the control valve for biasing the control valve in a direction opposite to an operational direction of the input shaft such that said valve spool is biased by an operational force produced by the fluid pressure regulated by said control valve and by the biasing force of said biasing means in directions opposite to each other;

means situated in the housing and integrally formed with the control valve, said means traveling relative to the housing such that a force produced by the fluid pressure regulated by said control valve and the biasing force of said biasing means are balanced;

a reaction chamber which communicates with said pressurized chamber and into which the fluid pressure regulated by said control valve is supplied, the fluid pressure supplied in said reaction chamber forcing said input shaft against said input;

a first electromagnetic shut-off valve for controlling communication/isolation between said accumulator and said pressurized chamber;

a second electromagnetic shut-off valve for controlling communication/isolation between said pressurized chamber and said reaction chamber; and a controller for controlling opening/closing of said first and second electromagnetic shut-off valves;

wherein said input shaft travels depending on the travel of said valve spool and according to a travel of the means travelling relative to the housing; said control valve is biased by a force of the biasing means in the direction opposite to the operational direction of the input shaft and is urged by the fluid pressure regulated by the control valve in the operational direction of the input shaft; and said valve spool travels such that said biasing force and said operational force are balanced.

17. A braking pressure intensifying master cylinder comprising:

a housing;

an input shaft penetrating through the housing and traveling by input applied in braking maneuver;

a control valve controlled by said input shaft to regulate a fluid pressure of a fluid pressure source to develop a fluid pressure corresponding to said input, said fluid pressure source having at least an accumulator in which pressure exceeding a setting value is stored, said control valve having a valve spool which is slidably disposed to develop said regulated fluid pressure and being formed of the valve spool and the housing;

a pressurized chamber connected to the control valve for receiving the fluid pressure regulated by said control valve;

a master cylinder piston which is actuated by the fluid pressure supplied into the pressurized chamber to develop a master cylinder pressure;

biasing means operationally connected to the control valve for biasing the control valve in a direction opposite to an operational direction of the input shaft such that said valve spool is biased by an operational force produced by the fluid pressure regulated by said control valve and by the biasing force of said biasing means in directions opposite to each other;

means situated in the housing and integrally formed with the control valve, said means traveling relative to the housing such that a force produced by the fluid pressure regulated by said control valve and the biasing force of said biasing means are balanced;

a reaction chamber which communicates with said pressurized chamber and into which the fluid pressure regulated by said control valve is supplied, the fluid pressure supplied in said reaction chamber forcing said input shaft against said input;

a first electromagnetic shut-off valve for controlling communication/isolation between said accumulator and said pressurized chamber;

a second electromagnetic shut-off valve for controlling communication/isolation between said pressurized chamber and said reaction chamber; and a controller for controlling opening/closing of said first and second electromagnetic shut-off valves;

wherein said input shaft travels according to a travel of the means travelling relative to the housing such that said biasing force which biases said valve spool and said operational force are balanced; and said control valve is biased by a force of the biasing means in the direction opposite to the operational direction of the input shaft and is urged by the fluid pressure regulated by the control valve in the operational direction of the input shaft.

* * * * *